United States Patent
Sinclair et al.

(10) Patent No.: US 6,527,641 B1
(45) Date of Patent: *Mar. 4, 2003

(54) SYSTEM FOR PROFILING MOBILE STATION ACTIVITY IN A PREDICTIVE COMMAND WIRELESS GAME SYSTEM

(75) Inventors: Matthew Frazer Sinclair, Neutral Bay (AU); Paul David Schulz, Kirribilli (AU); Kenneth Bo Larsen, Carrs Park (AU)

(73) Assignee: Nokia Corporation, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 09/404,759

(22) Filed: Sep. 24, 1999

(51) Int. Cl.⁷ ............................................. A63F 13/12
(52) U.S. Cl. ........................... 463/39; 463/40; 463/41; 463/42; 455/412; 455/456
(58) Field of Search ........................ 463/39, 43, 44, 463/42, 30, 31; 273/371; 455/412, 456, 556–557, 406, 66; 709/202, 223, 219; 379/211.02; 707/3, 4, 10, 102

(56) References Cited

U.S. PATENT DOCUMENTS

| | | | | |
|---|---|---|---|---|
| 4,445,187 A | * | 4/1984 | Best ............................. | 463/31 |
| 5,550,907 A | * | 8/1996 | Carlsen ................. | 379/211.02 |
| 5,561,419 A | | 10/1996 | Sasaki et al. .......... | 340/825.08 |
| 5,593,349 A | * | 1/1997 | Mighel et al. ................. | 463/30 |
| 5,605,505 A | | 2/1997 | Han ............................. | 463/39 |
| 5,609,525 A | | 3/1997 | Ohno et al. ................... | 463/43 |
| 5,618,045 A | | 4/1997 | Kagan et al. ................. | 463/40 |
| 5,717,923 A | * | 2/1998 | Dedrick ....................... | 707/102 |
| 5,727,950 A | * | 3/1998 | Cook et al. .................. | 434/350 |
| 5,738,583 A | | 4/1998 | Comas et al. ................. | 463/40 |
| 5,797,085 A | | 8/1998 | Beuk et al. .................... | 455/88 |
| 5,806,849 A | | 9/1998 | Rutkowski .................. | 273/438 |
| 5,809,415 A | | 9/1998 | Rossmann | |
| 5,855,483 A | | 1/1999 | Collins et al. .............. | 434/322 |
| 5,855,515 A | | 1/1999 | Pease et al. .................. | 463/27 |
| 5,893,064 A | | 4/1999 | Kudirka et al. ............. | 704/275 |
| 5,895,471 A | | 4/1999 | King et al. .................. | 707/104 |
| 5,899,810 A | | 5/1999 | Smith | |
| 5,933,778 A | * | 8/1999 | Buhrmann et al. ......... | 455/461 |
| 5,971,397 A | * | 10/1999 | Miguel et al. .............. | 273/371 |
| 5,974,300 A | * | 10/1999 | Laporta et al. ............. | 455/31.2 |
| 5,991,735 A | * | 11/1999 | Gerace ........................ | 705/10 |
| 5,999,808 A | * | 12/1999 | Ladue ........................ | 455/412 |
| 6,356,905 B1 | * | 3/2002 | Gershman et al. ............ | 707/10 |
| 6,401,085 B1 | * | 6/2002 | Gershman et al. ............. | 707/4 |

FOREIGN PATENT DOCUMENTS

| | | |
|---|---|---|
| EP | 0883077 A1 | 9/1998 |
| WO | WO93/23125 | 11/1993 |
| WO | WO97/10561 | 3/1997 |
| WO | WO98/17359 | 4/1998 |
| WO | WO98/47589 | 10/1998 |

OTHER PUBLICATIONS

Interactive Text in An Animated Age, by Keith Ferrell, Compute!, vol. 10, No. 1, Jan. 1988 pp 17–19.

Macedonia, M.R.: "A Taxonomy for Networked Virtual Environments"; IEEE Multimedia, US, IEEE Computer Society; vol. 4, No. 1, Jan. 1997; pp. 48–56, XP000669955; ISSN: 1070-986X;.

* cited by examiner

Primary Examiner—Jessica Harrison
Assistant Examiner—Yveste Cherubin
(74) Attorney, Agent, or Firm—Allen Scott Lineberry; Stephen J. Wyse; Steven A. Shaw

(57) ABSTRACT

A system and a method for the customization of an interactive game based on mobile station activity. The interactive game is played in a virtual space using a wireless mobile station as a user interface. The game is tracked and controlled using a game center and a game server. The game server executes a software application that runs a game center. A command set is provided for each state within the game. The choice of a command from the command set changes the game state. Games are designed to be customizable based on, for example, current location of the mobile station, call usage on the mobile station, or wireless services utilized by the mobile station.

44 Claims, 22 Drawing Sheets

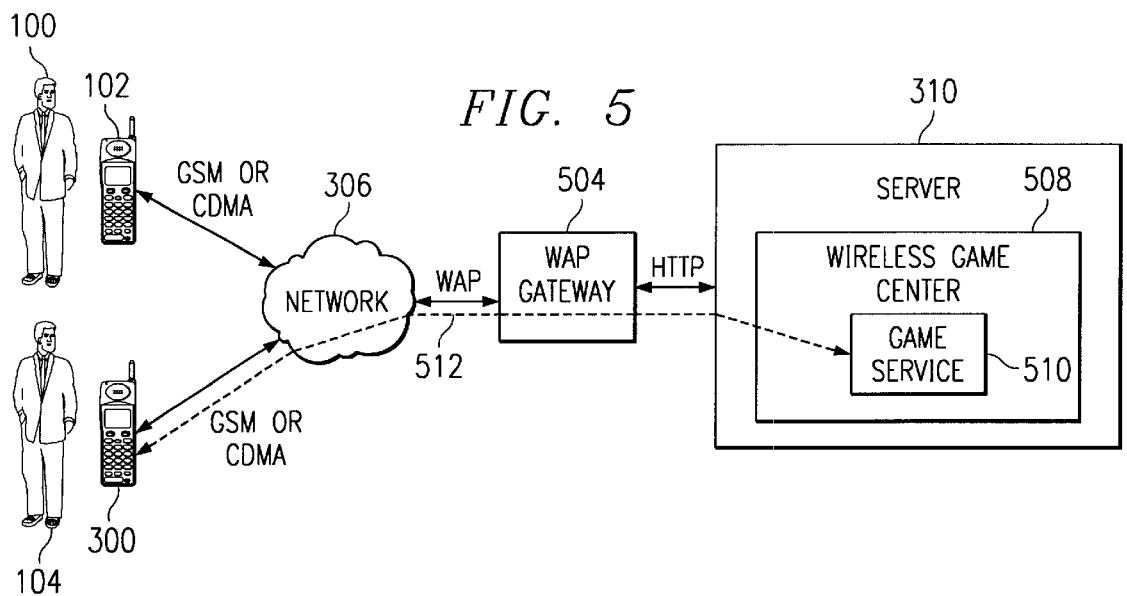
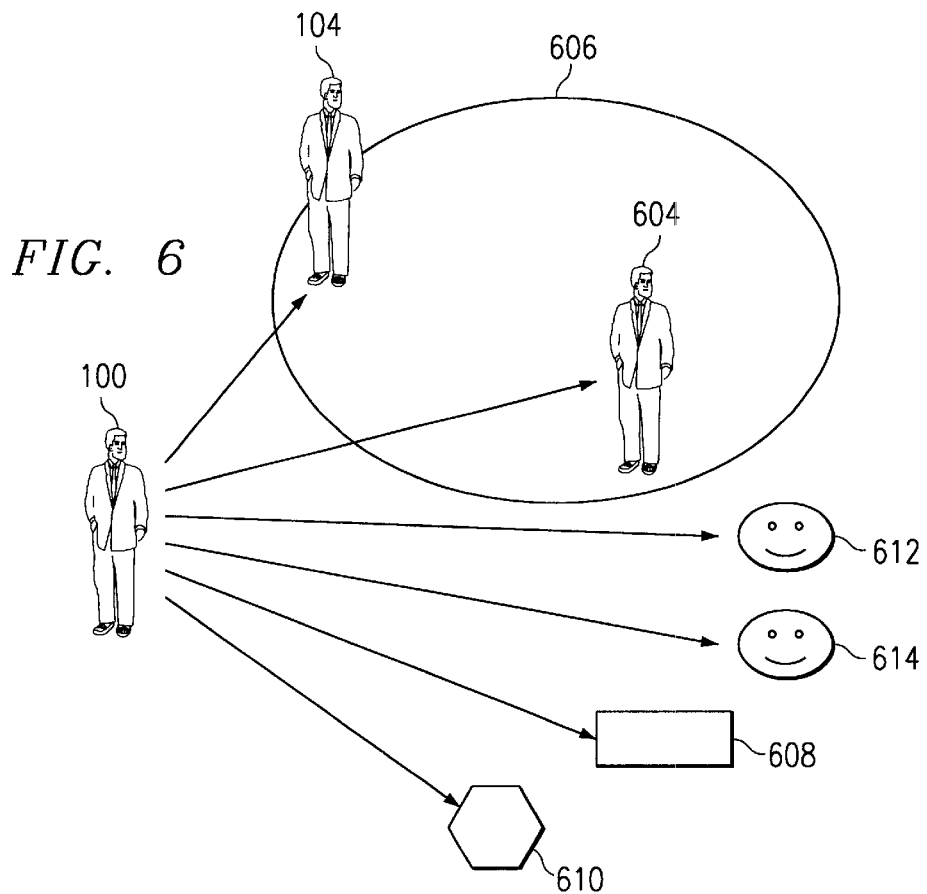

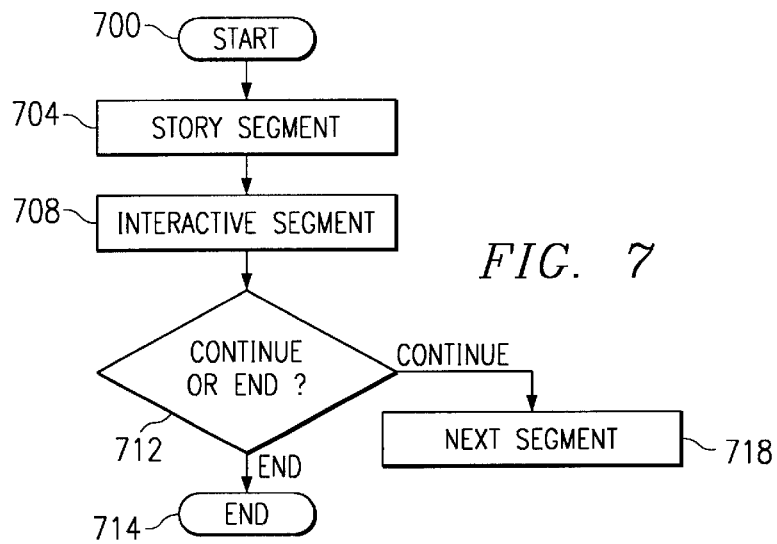
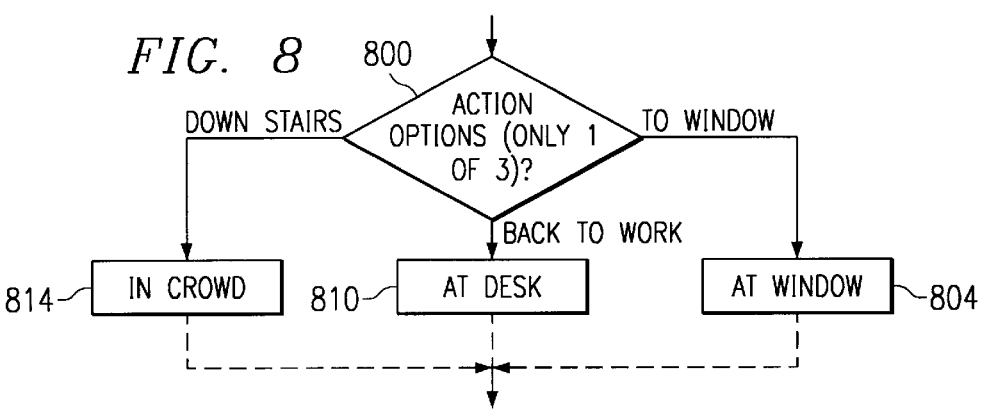
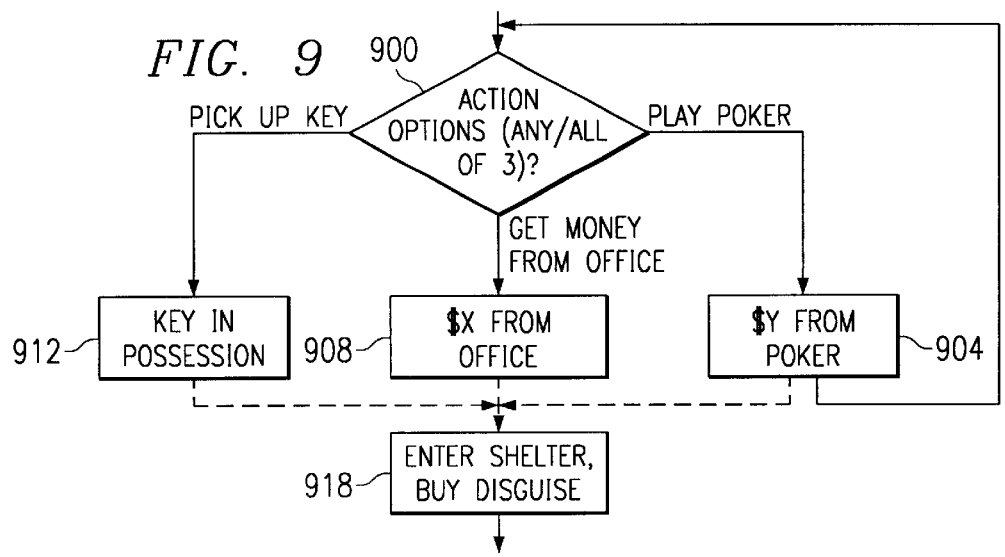

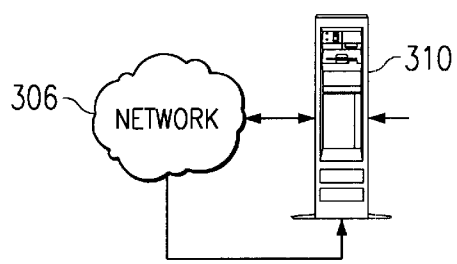
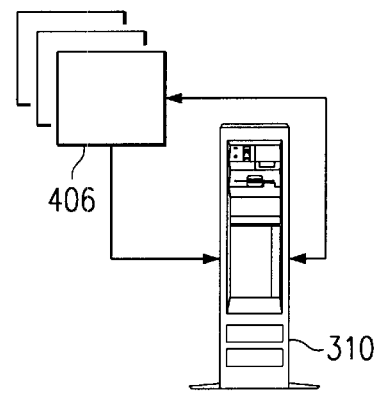
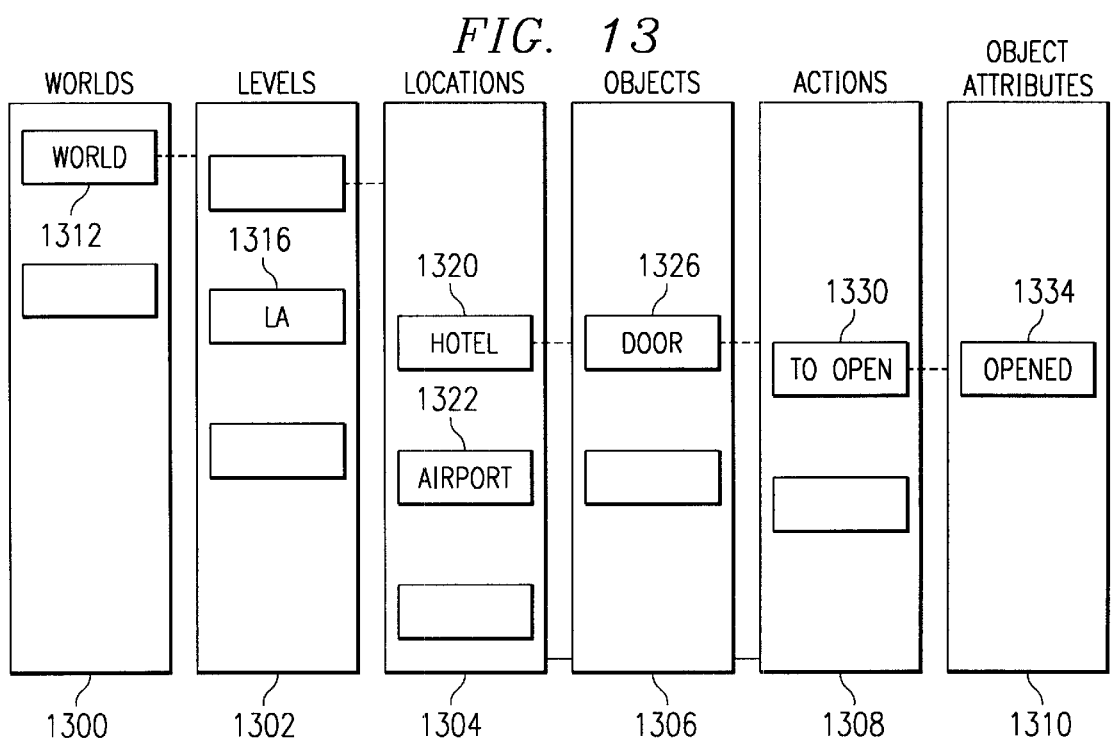

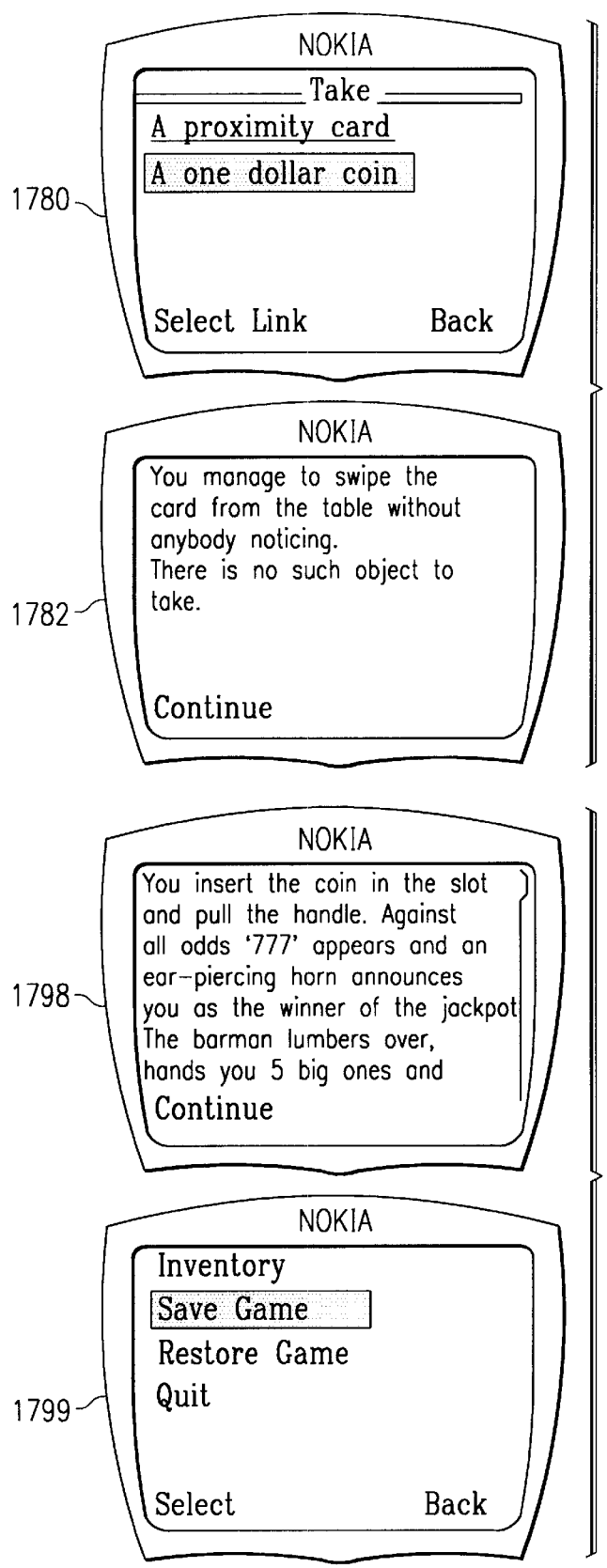

SYSTEM FOR PROFILING MOBILE STATION ACTIVITY IN A PREDICTIVE COMMAND WIRELESS GAME SYSTEM

CROSS-REFERENCE TO RELATED APPLICATION

This application is related to and has figures and descriptions in common with the following applications: Ser. No. 09/406,596, Entitled: A Wireless System for Interacting with a Virtual Space, and Ser. No.: 09/405,490, Entitled: Interactive Voice, Wireless Game System Using Predictive Command Input, each of which is filed simultaneously herewith.

FIELD OF THE INVENTION

This invention relates to wireless games, particularly, customizing interactive games with one or more players according to past mobile station activity.

BACKGROUND OF THE INVENTION

Electronic games have become a major part of the entertainment industry in today's modern world. The playing of electronic games on stand-alone terminals has long been popular. However, in recent years these games have migrated into a network environment.

As the complexity of electronic games, powered by increasingly sophisticated hardware and software, improves game-players often find themselves playing games which are not necessarily suited to their particular temperaments, habits, and reactions. Clearly, designers and manufacturers of electronic games must cater to the broadest possible commercial market. However in so doing there are many game players who are less than satisfied with the final result.

The restrictive user interfaces presented by mobile stations present a particular challenge when considering game-playing across a mobile network. In particular, when considering network games of the "interactive fiction" or "adventure" style, a game-player typically suffers from a limited perceptual consciousness of the potential context of the game, being constrained by the limited user interface presented by the typical mobile station. The richness of environmental variables which can potentially be brought into the context of an adventure game are not easily incorporated into such games in current mobile station systems.

SUMMARY OF THE INVENTION

The disclosed embodiments of the present application provide a system and a method for providing an interface to and customizing an interactive game for one or more players. The interactive game of the presently preferred embodiment is played in a wireless environment using a mobile station as a user interface. The game is tracked and controlled using a game center and a game server. The game server is typically at a location remote from the mobile station. Moreover, communication between the game server and the mobile station is typically performed using a base station connected to a telecommunications network. The game server executes a software application which runs a game center. Individual games are managed within the context of this application.

In the presently preferred embodiment, the games are text based. A command set is provided for each state within the game. The choice of a command from the command set changes the game state. Individual games are designed to be customizable. That is, attributes of the mobile station interface can be used to adjust game parameters. The game parameters can be adjusted based on, for example, current location of the mobile station, call usage on the mobile station, or wireless services utilized by the mobile station.

The disclosed embodiments provide numerous advantages. For example, use of a mobile station as an interface provides a ready source of attributes from which a game can be customized. A mobile station offers a number of unique facilities that can be integrated into a game play environment, any one or combination of which can provide a highly optimized gaming experience. For example, contacts and calendar listings in a mobile station can be modified by the game server or sound recording capabilities in a mobile station can be used to advance game play. Another advantage is that the use of a mobile station as an interface provides for the possibility of interactivity with other users and/or a server which are remote from the mobile station. For another example, use of a mobile station as an interface provides a shifting location from which new games can be customized or games can be presented which are customized to location which a user plans on visiting. For another example, use of a predictive command set allows for the reduced keypad of a mobile station to be used as an interface to the gaming application.

BRIEF DESCRIPTION OF THE DRAWINGS

The disclosed embodiments will be described with reference to the accompanying drawings, which are incorporated in the specification hereof by reference, wherein:

FIG. 5 presents a more detailed view of the infrastructure supporting the virtual space;

FIG. 6 depicts various participants "inhabiting" the virtual space;

FIG. 7 represents a process flow for a segment of an interactive fiction game as in the presently preferred embodiment;

FIG. 8 shows further detail of the story segment;

FIG. 9 depicts the interactive segment in more detail;

FIG. 11 depicts network-related mobile station usage information associated with the player 100 which is used to enhance the realism and enjoyment of the game of the presently preferred embodiment;

FIG. 12 depicts how information regarding the manner in which player 100 plays the interactive fiction game of the presently preferred embodiment being incorporated into the game;

FIG. 13 depicts a lightweight interactive fiction engine language (LIFE) used to create the virtual space in a cost effective and well documented manner;

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
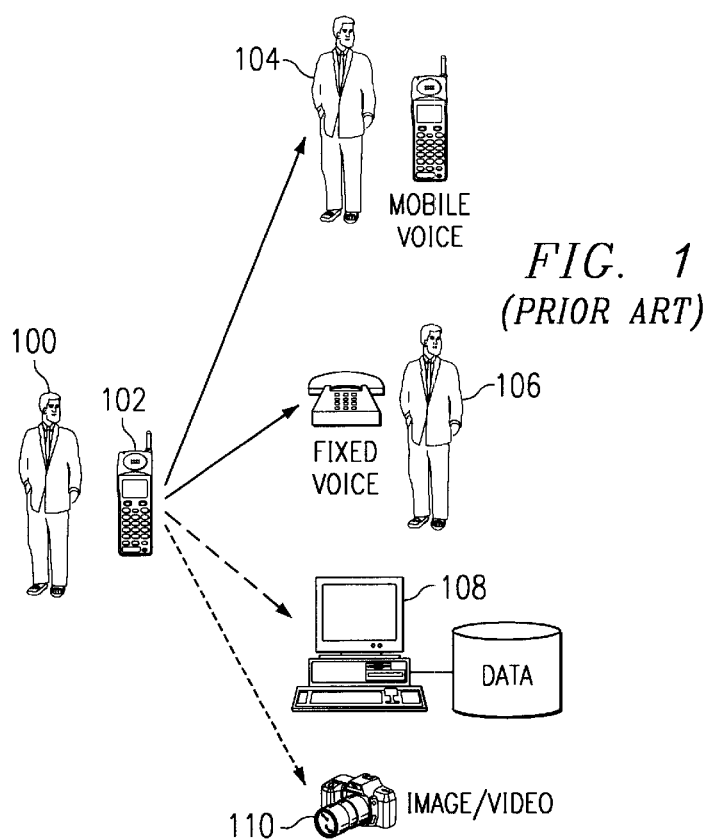
FIG. 1 depicts a user of a mobile station communicating with another mobile station user and a fixed terminal voice user.

FIG. 1 depicts a prior art system wherein a user 100 of a mobile station 102 communicates with another mobile station user 104 and a fixed terminal voice user 106. Voice communication between the initial user 100 and the other two users 104 and 106 is well served by the present mobile network and terminal infrastructure. However, the user 100 has only limited access to data services 108 and even less to image/video services 110. FIG. 1 graphically illustrates how the mobile station user 100 is provided with only very restricted access to a rich communications environment.

Figure 2:
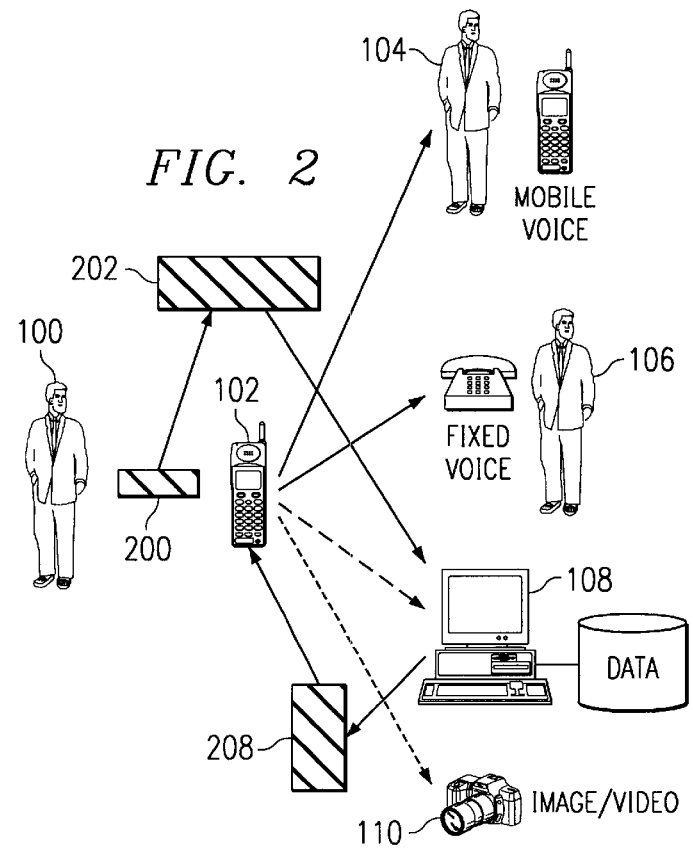
FIG. 2 depicts enhanced mobile telecommunications according to a preferred embodiment.

FIG. 2 depicts enhanced mobile telecommunications according to a preferred embodiment of the invention. A number of additional elements, depicted by shaded boxes 200, 202 and 208, are introduced. These additional elements provide the mobile station user 100 with an enhanced access capability to the telecommunications environment. The shaded block 200 depicts a simpler and more effective man/machine interface between the mobile station user 100 and his or her mobile station 102. A mobile station user interface is designed primarily for setting up voice communications, therefore, it is inherently unsuited to the task of providing a rich environment for perception of a virtual space. The new element 200 is described in more detail in the discussion of FIG. 4.

The element 202 depicts the use of "profiling" to adapt the telecommunications environment to the habits, tendencies, and history of the user 100. The use of profiling enables services within the broader telecommunications environment to be "customized". This customization effectively tailors the services to the particular user 100. Thus, instead of generic telecommunications services being provided to users who are anything but generic, the services become individually tailored. Tailoring the services serves to streamline and make more effective communications with the user 100. This effect is explained in more detail in relation to FIGS. 11 and 12.

The element 208 depicts use of adjunct support equipment, such as interactive voice response systems. Such equipment is used to augment and support services being provided from the telecommunications environment to the user 100. This equipment is explained in more detail in FIG. 16.

The abstract concept of "virtual space" representing the telecommunications environment within which the mobile station user can interact is introduced in the following figures. This abstract concept is first outlined in general terms, and then a specific example of a virtual space is used for a more detailed description. The virtual space in the presently preferred embodiment is described as being an interactive fiction game which is played across a wireless network. However, it should be noted that most if not all of the features described in the presently preferred embodiment are useful to a mobile station user for other pursuits, such as, business activities, for example.

As will be explained further, interactive fiction games can enable a user 100 to interact with other users 104 and 106, with various data structures, and with intelligent software entities which can be supported on data services 108.

Figure 3:
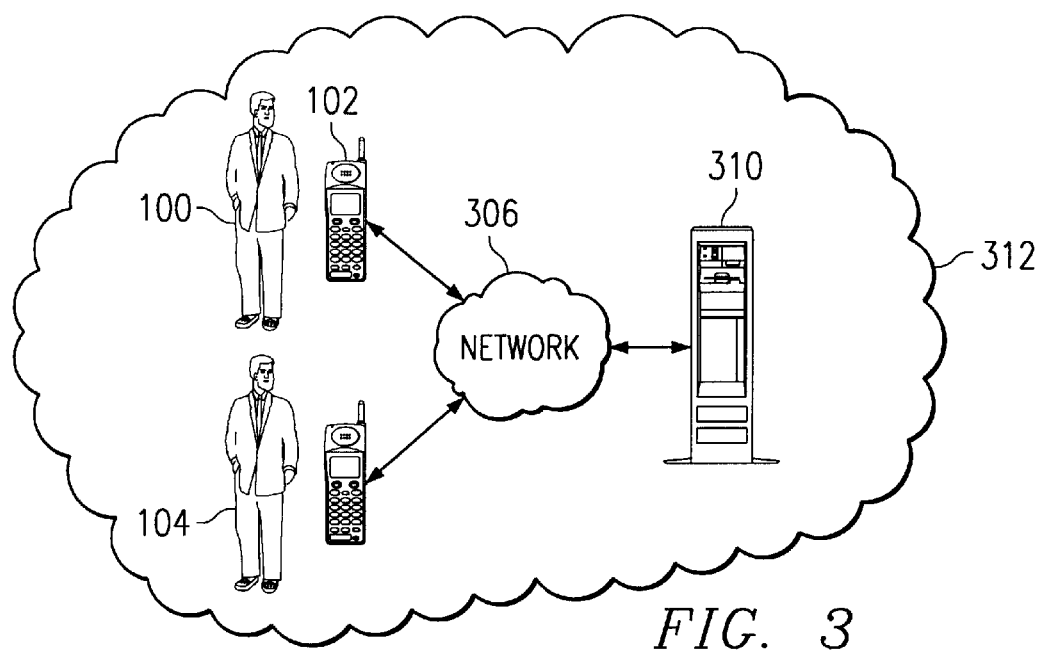
FIG. 3 presents a system configuration of a wireless communication system which can support a "virtual space" communication paradigm.

FIG. 3 presents a system configuration of a wireless communication system which can support a "virtual space" communication paradigm. A mobile user 100 communicates, by means of a mobile station 102, which in turn uses a wireless connection to a network 306. The network 306 in turn, is connected to a server 310. The server 310 is described in more detail in FIG. 5. In the presently preferred embodiment, the elements described in FIG. 3 constitute interacting component parts supporting a virtual space 312. In the presently preferred embodiment, the virtual space 312 provides a mobile station user 100 with a perceptual awareness of other mobile station users 104, as in a telephone voice call. The virtual space 312 also provides a mobile station user 100 with a perceptual awareness of the various other elements within the virtual space 312.

In order for a mobile user 100 to be perceptually aware of other elements in the virtual space 312, the dynamics by which the user 100 interacts with the mobile station 102 and with the other elements in the virtual space 312, via the mobile station 102, must be sufficiently simple and intuitive. The goal of this interactive mechanism of virtual space and mobile station is to allow the user 100 to interact with a significant number of these elements without extensive conscious effort.

Figure 4:
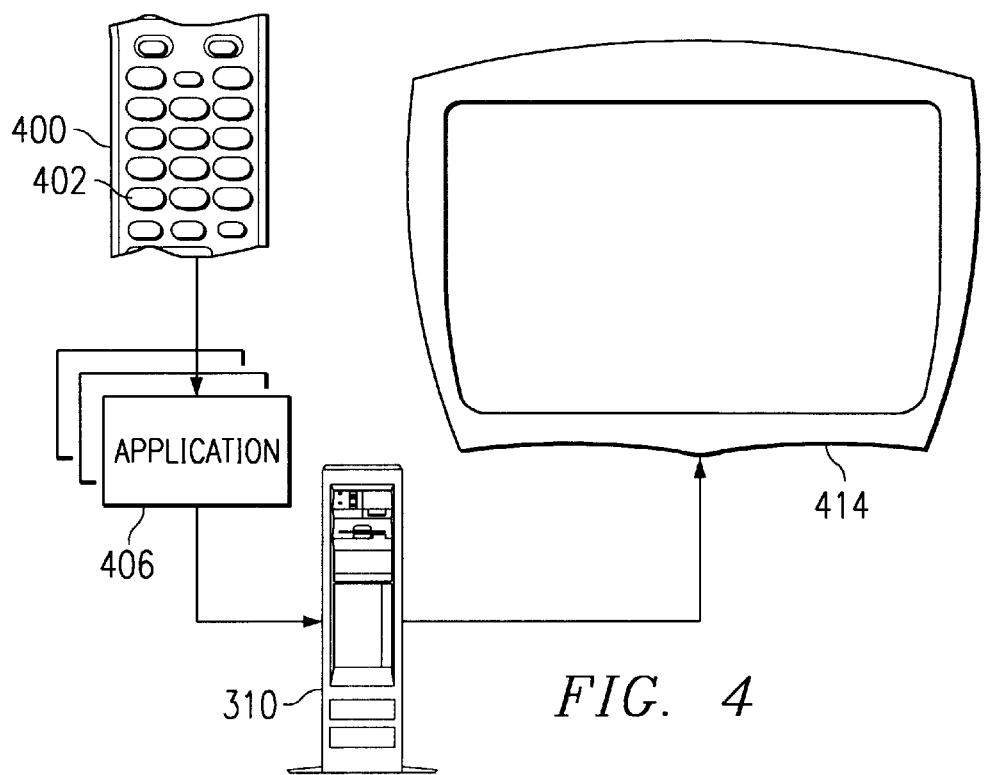
FIG. 4 depicts aspects of a mechanism by which the simple intuitive dynamics previously described may be implemented.

FIG. 4 depicts aspects of a mechanism by which the innovative dynamics previously described may be implemented. A reduced keypad 400, which comprises a small set of individual keys 402, transmits an output resulting from operation of the keys 402 to an application 406 written in a lightweight interactive language. The attributes of the language, according to the presently preferred embodiment, are described in more detail with reference to FIG. 13. The application 406 interacts with the server 310. The server 310 also produces a display of desired information on a display device 414. The reduced keypad 400 and display 414 can both be incorporated into the mobile station 102. Some elements of the lightweight language application 406 can be resident on the mobile station 102, while other elements of the lightweight language application 406 can be resident in the server 310. The server 310 is also connected to other support elements for the virtual space 312, such as other users, for example. The combination of reduced keyboard 400, lightweight interactive language application 406, server 310 and display 414 provide a platform which supports the intuitive dynamics required for a user 100 to have a perceptual awareness of the virtual space 312. Such an awareness enables the user 100 to interact with the virtual space 312 in a simple and effective manner. Another aspect of the system described in FIG. 4 is that the reduced keyboard 400 and lightweight language application 406 operate in conjunction with a "menu" based text display mechanism on the display 414. Alternatively, text displayed on display 414 may contain hypertext links that can facilitate simple and efficient selection of options using the reduced keyboard 400.

FIG. 5 presents a more detailed view of the infrastructure supporting the virtual space 312. In the presently preferred embodiment, a virtual space 312 consisting of a multi-player interactive fiction game (MIF), is used as the basis for the description. However, an individual interactive fiction game can make just as an effective use of the disclosed embodiments. In FIG. 5, two players using mobile stations 102 and 300 are connected by wireless communication links to a network 306. The network 306 is in turn connected to a wireless application protocol (WAP) gateway 504. The WAP gateway 504 is connected to the server 310. WAP has been developed to support use of a markup language, for example, wireless markup language (or WML), over a wireless network. Of course, other markup languages such as html, xhtml, or other languages with suitable features can be used. Additional information on WAP can be found in the WAP 1.1 Specification Suite, copyright date 1999, currently available from the Wireless Application Protocol Forum, Ltd., and incorporated herein by reference. The server 310 incorporates a wireless game center 508, which in turn incorporates a game service 510 that supports the multi-player interactive fiction game. The user of the mobile station 300 establishes an interactive session 512 through both the network 306 and the wireless application protocol gateway 504, to the game service 510.

FIG. 6 depicts various participants "inhabiting" the virtual space 312. The user 100 communicates via an associated virtual representation of him/herself (the virtual representation being referred to as a "player") in the course of the multi-player interactive fiction game of the presently preferred embodiment. In this way, the user, now player, 100 interacts with other users, or players 104 and 604. Such other users 104 and 604 may belong to the class of human players 606 in the virtual space 312. In addition, the player 100 can interact with software entities 612 or agents 614. The entities and agents 612 and 614 can assimilate and act upon an analysis of data inputs from player 100. The player 100 can also interact with objects 610 and 608 which are arbitrarily defined in the virtual space 312. In the context of a multi-player interactive fiction game, as in the presently preferred embodiment, an object 608 may, for example, be perceived by the player 100 as an amount of money to be either taken or left on a table. Objects will be explained in more detail in FIG. 9.

FIG. 7 represents a process flow for a segment of an interactive fiction game as in the presently preferred embodiment. The game commences (Step 700) and proceeds to a story segment (Step 704). Thereafter, the process proceeds to an interactive segment (Step 708) after which a decision process (Step 712) is encountered. The decision process (Step 712) offers two options, namely to continue or to end. A choice of "continue" will direct the process to the next segment (Step 718). Alternatively, a choice to end the segment will direct the process to the "end" (Step 714).

FIG. 8 shows further detail of the story segment 704 described in relation to FIG. 7. The player 100 is presented with one of three action options (Step 800). In a scenario being considered here, the player 100 can choose either to go down a set of stairs after which he will become a member of a crowd (Step 814), to go back to work by remaining at a desk (Step 810), or to move to the window (Step 804). The aforementioned options provide the player with the ability to navigate spatially among features in the virtual space, ie. along roads, within buildings, on trains, and so on. All of the various options and choices take the player 100 through the connected locations defined for the particular segment of the game being played. In FIG. 8, all three options result in the process subsequently being directed to the interactive segment (Step 708).

FIG. 9 depicts the interactive segment 708 in more detail. In the multi-player interactive fiction game of the presently preferred embodiment, the interactive segment 708 takes place in a cafe, where the various players 100 and 104 can "meet" and interact. Furthermore, the software agents 612 and 614 can also participate and the various objects 610 and 608 can be found. Therefore, while the story segment 704 provides a mechanism by which the player 100 can navigate spatially among a geographic set of connected locations, the interactive segment 708 is a process whereby the player 100 interacts with the various players and features in the virtual space 312. In FIG. 9, a decision (Step 900) presents a number of options to the player 100. Unlike the decision block (Step 800) of FIG. 8, this decision block (Step 900) allows the player 100 to select one or more of the options. Thus, assuming that the player 100 is required to obtain a certain amount of money, he may elect to play poker (Step 904). If he wins the game, the winnings constitute the needed cash. The player could also elect to take cash from the office (Step 908). The process can then be directed back to the decision option (Step 900). The player 100 can now elect to pick up a key (Step 912) and take it into his possession. Alternatively, the player 100 can elect to enter a shelter and purchase a disguise (Step 918). However, in order to enter the shelter, a key is required. In order to purchase a disguise, a certain amount of cash is required. Therefore, the prior actions of the player 100 determine his ability to proceed onwards in the process or his need to return and retrace his steps, if he is so able to do by the definition of the game software.

Figure 10:
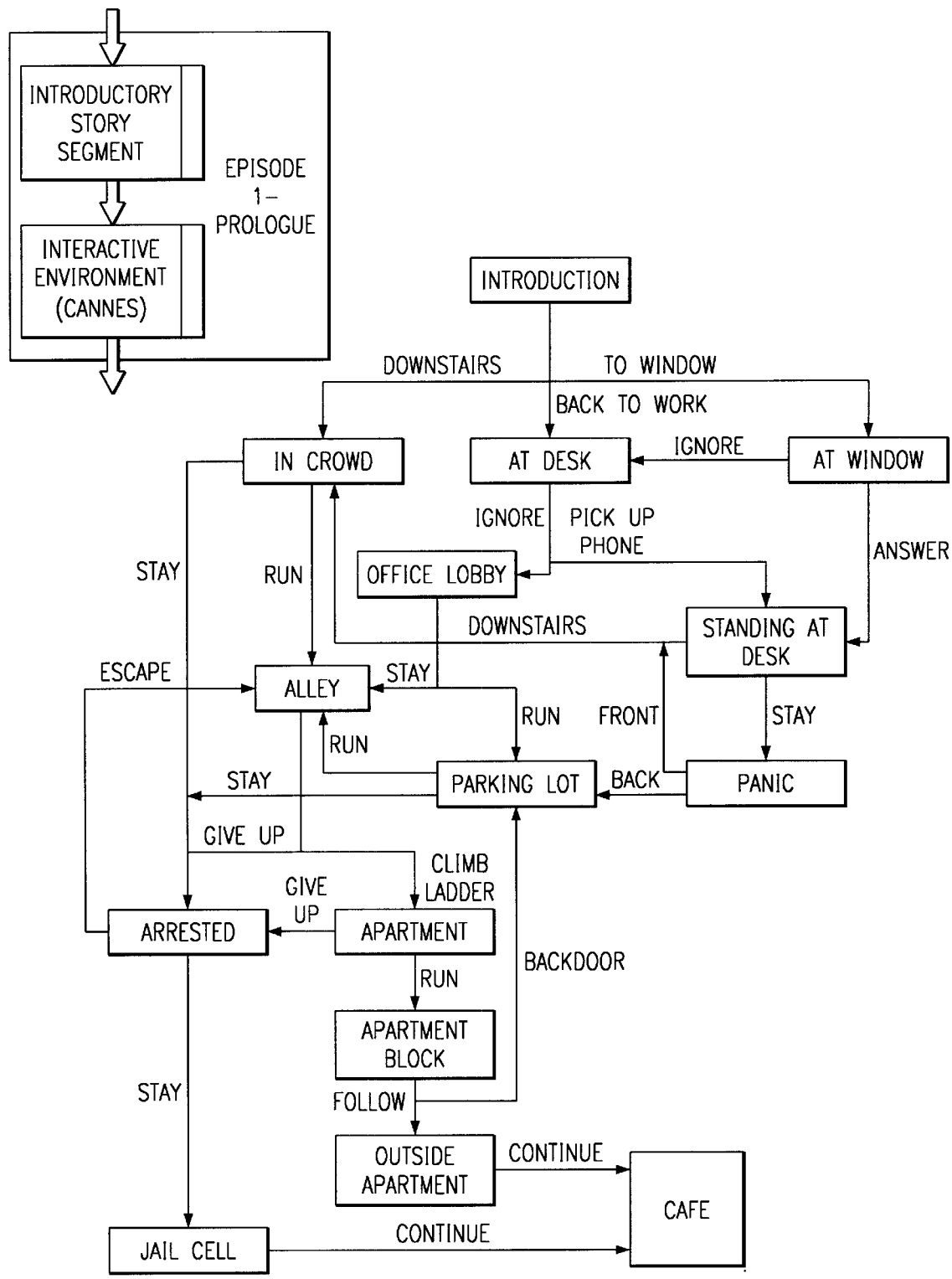
FIG. 10 depicts another embodiment of an interactive fiction game.

FIG. 10 depicts another embodiment of an interactive fiction game. FIG. 10 includes an expanded version of a virtual world with possible courses of navigation.

FIG. 17 depicts a working example of the presently preferred embodiment showing user information displayed on the display 414 of a mobile station 102. The user 100 can interact with the game via the presented options by way of scroll and input keys 402 forming a part of the reduced keypad 400. Conventional mobile stations have such keys. Voice commands may also be used for interaction with the game. Voice commands may be used, for example, when responding to a prompt, such as, from a character in the game.

To commence the game, the player 100 must login with a user name and password using the Login screen 1702. The user name and password are pre-configured on the game server. The game server validates the user name and password. If successful, the player is logged into the game and is presented with an initial set of instructions 1704. In the presently preferred embodiment, the instructions are: "Welcome, <player name>! You can use the roller key to scroll text and menus. The scrollbar on the right indicates when more text is available for viewing. Select the "Options" menu to begin a new game, restore a previous game or to get more instructions on how to play."

The player may elect to start a new game, resume a saved game, get the full set of instructions for the game, or quit the game completely 1706. If the player elects to play a new game, the story begins. The first story element is presented to the player 1708. A story element can read, for example, "You arrived at the office this morning in a state of despondency. You were dissatisfied. Happy and successful, but at the same time there is a nagging feeling of something being wrong. Here you are in this job that isn't quite right. It was a job that you had to accept to pay the bills. You'd wanted to be a painter really, but your mother said at the time 'no-one gives you any money 'til you're dead'. And what good is money to a dead guy." At the end of this story element, the player is presented with a list of actions that can be taken at this stage in the story 1710. The selected action will determine the next course to be taken in the story, for example, "Do you go downstairs, go to the window, or go back to work?"

The story element related to the selection, for example, to go downstairs, is presented 1712. The story element can read, for example, "You go to the elevator and head down to the lobby. You walk slowly across it toward the street but cannot see anybody that you recognize though the glass facade. You step out through the automatic door and onto the street. The crowd seems to part and you see a woman by the curb. She is talking to a policeman with his back turned diagonally toward you. You circle around to your right a little in order to see the woman's face from front on. The policeman is saying 'Do you know who did this?' The woman looks up and over the policeman's shoulder and in your eye with a look of reproach and your stomach falls. She points straight at you and says 'He did!'. The police move quickly. They are heading straight towards you."

At the end of this story element, the player is presented with a list of actions that can be taken at this stage in the story 1714, for example, "Do you stay or do you run?" The story element related to the selection, for example, to run, is presented 1716. The story element can read, for example, "You stand there in amazement as several police walk over to you and grab you. Pinning your arms behind you they put handcuffs on your wrists and drag you off to a waiting car. When you arrive at the station they tell you that you are accused of industrial espionage—citing your briefcase as evidence. You insist that it is your briefcase and they say 'We'll soon see'. They open it and papers that are clearly not yours are revealed. You protest but it falls on deaf ears. On the way to the cells, now with your handcuffs removed, the guard stops to talk to someone else. He has his back turned and behind you is an open door to the carpark. You can't believe this turn of events. Arrested!"

At the end of this story element, the player is presented with a list of actions that can be taken at this stage in the story 1718, for example, "Do you remain calm or try to escape?" The story element related to the selection, for example, to escape, is presented 1720. The story element can read, for example, "You don't really know why you do this but you turn and run. Somehow you know what will happen if you stay. You will be falsely accused and will have to go through a whole load of legal rigmarole. Your life and all you have worked for could be erased in the ensuing publicity. The policeman again calls on you to stop but you just keep running. You duck into an alley with the policeman not far behind. As you run past a doorway you hear laughter that somehow seems to be directed at you. You turn another corner and it's a dead end. You can hear the running boots of the cops right behind. You look around desperately for an escape. There is a garbage skip right beside you with a fire escape above it. If you leap to the top of the bin you might just reach the ladder. Or perhaps now might be the right time to give yourself up."

At the end of this story element, the player is presented with a list of actions that can be taken at this stage in the story 1722, for example, "Do you give up or climb the ladder?" The story element related to the selection, for example, to give up, is presented 1724. The story element can read, for example, "You can't believe this turn of events. Arrested! At the end of this story element, the player is presented with a list of actions that can be taken at this stage in the story 1726, for example, "Do you remain calm or try to escape? The story element related to the selection, for example, to remain calm, is presented 1728. The story element can read, for example, "You spend most of the day and night in the cell, furious at what has happened. The next morning bail is posted for you by a mysterious person who will not allow themselves to be identified. As you leave the police station you feel quite confused. You do not want to go home or back to work just yet. You have to work out what to do about all of this. You step into a café across the street from the police station. What you really need is a quiet coffee and some time to figure all of this out. There is an enormous amount on your mind. This has been an incredibly confusing day." When the story segment is complete, the player is given the option to continue with the game and move into the interactive environment attached to this story segment 1730.

The mode of game play now changes from a directed story into navigating and taking actions within a planned environment. To move through the interactive environment and complete the episode, the player 100 will need to get enough money to buy a costume as a disguise. Once acquired, the player 100 must get a photo taken with the costume on, buy a passport from a man in the bar, take a taxi to the airport, buy a ticket, and board a plane to Helsinki. At each location in the interactive environment, a description of the location is presented along with a list of items that can be seen at the location and the actions that the player can take at that location. If the player 100 chooses to continue, the next story element is presented 1732.

In the presently preferred embodiment, a description of the café is presented, for example, "You are in a café. There are booths by the wall and tables in the center. A bar runs along another wall. There are two women sitting at one of the tables, deeply engaged in conversation." At the end of this story element, the player is presented with a list of actions that can be taken at this stage in the story. The story element related to the selection, for example, to look around, is presented. The story element can read, for example, "At the café, you see a proximity card and a one dollar coin." 1734.

At the end of this description, the player is presented with a list of actions that can be taken 1736, for example, go, look, drop, examine, or use an object. A list of options pertaining to the action elected, for example, go, is presented 1738. The options can include, for example, go outside the cafe. The player is presented with a description of the environment that they can move into, the items that they can see, and the actions that they can take at this time 1740. The description can read, for example, "You are in an old lane. The backs of several buildings face onto it. Bare, black metal ladders lead from the ground up into the haze. Dirty red brick walls with graffiti, soot and bird droppings likewise rise up out of sight. It smells bad. A few rats slip into the shadows as you approach. In front of you is the entry to what looks like a costume shop."

At the end of this description, the player is presented with a list of actions that can be taken 1742, for example, go, look, drop, examine, or use an object. A list of options pertaining to the action elected, for example, go, is presented 1744. The list can include places to go, for example, into the costume shop, east, west or back into the café. The story element related to the selection, for example, go into the costume shop, is presented 1746. The story element can include, for example, a list of things that the player 100 can see in the costume shop and actions that he can take. The story element can read, for example, "You see a shop cluttered with masks and wigs, costumes and hats. Racks of body parts are on the east wall behind the counter. Also behind the counter stands a middle-aged man with lank black curly hair. You don't notice him at first because he blends in with the noses, ears, false moustaches, and wigs behind him. He ignores you, pointedly, it seems. In the south wall a door with dirty glass leads to the main street."

At the end of this story element, the player is presented with a list of possibilities 1748. The list can include, for example, seeing a shopkeeper. A list of actions that can be taken at this stage in the story is displayed 1750, for example, the player 100 can go, talk to, look, examine or use an object at this location. The characters related to the selection, for example, talk to someone, are presented 1752. The dialogue related to the person the player 100 chooses to speak to is displayed 1754. The dialogue with the shopkeeper from the player's 100 perspective, for example, can read: "'I need a disguise.' He says. 'Disguises, disguises? That's all anybody ever wants these days, whatever happened to the good old days of just getting dressed up for fun. What you like, I have a whole bunch of disguises, some are better than others and their prices reflect that. I mean, a cheap disguise is really easy to see through but the more expensive ones are impossible—your own mother won't recognize you. Here's the list with the prices clearly shown in red beside them. By the way, weren't you just in here?'"

At the end of this story element, the player is presented with a list of actions that can be taken 1756. The list can include, for example, go, look, drop, examine, buy, or use an object at this location. A list of items pertaining to the chosen action, for example, buy an object is displayed 1758, The display can read, for example, "You can buy any one of three different costumes, each at a different price, and each associated with a different level of probability that the police won't recognize you when they see you. If you buy the $100 outfit, you won't be seen. If you buy the cheapest outfit, there is a great chance that you will be recognized by the police. If you buy a reasonable costume, you have a reasonable chance of fooling the police."

At the end of this explanation, the player is presented with a story element relating to the choice of, for example, attempting to buy the most expensive costume 1760. The story element can read, for example, "You can pay with cash or with your credit card. You only have $45 in your wallet (you can see this if you look at your inventory). Being short of cash, you hand the shopkeeper your credit card. After a brief phone call from the back room, the shopkeeper returns and pointedly informs you that the card has been cancelled. He promptly cuts the card in half and throws it into the bin. To buy the costume, you will need to find some money. Perhaps you have some money in your office or you can win some money at the poker machines in the bar."

At the end of this story element, the player is presented with a list of possible actions 1762. The list can include, for example, go, talk to, look, examine or use an object at this location. The locations related to the selection, for example, go, are presented 1764. The available location, for example, can read "You can only go out into the lane from the costume shop." A list of actions pertaining to the selection is displayed 1766. Because the player 100 has already been to the lane, only a short description of the lane is presented along with the actions possible.

At any point in the game, the player can review his inventory 1768. When the player reviews his inventory, a list of items in the inventory is presented 1770. The inventory can read, for example, "You have a leather wallet and a mobile phone." Any item in inventory can be examined. A description of the item examined 1772, for example, the wallet, can be that your leather wallet is an expensive looking leather wallet containing $45 and little else.

The game is continued after examining the inventory items. The player may, for example, move from the lane back into the café." A list of items that may be seen at the cafe is displayed 1774. The list may include, for example, a proximity card and a one-dollar coin. Objects are taken using the take action 1778. When an object is taken from a location, it is added to the player's inventory. Selecting the take option displays a list of items that the player can see 1780. Items to be taken are selected form the list. When an item is taken, feedback indicating success or failure is displayed 1782. Taking the proximity card, for example, can yield the feedback "You manage to swipe the card from the table without anybody noticing."

The player may look around any current location 1784. Looking around a hotel, for example, will yield a description of what can be seen 1786. The description can read, for example, "In the south wall is a screen door leading to the kitchen of a hotel. You can hear the chef singing and see cooks wandering to and fro across your field of vision. In the north wall, above your head is a barred window that you know is a cell window at the police station."

If the player, for example, moves into the hotel lobby, a description of the lobby is presented 1788. The player is told that there is a photo booth in the corner, for example, "In the south wall a rotating door leads to the main street. In the corner is a photo booth. You step into a quiet alcove behind a palm . . . " The Take Photo action will appear in the list of allowed actions at the end of the location description.

If the player proceeds into the bar, a description of the bar will be displayed, for example, a guy in a raincoat and a poker machine 1790. Obtaining a passport requires talking to the guy in the raincoat. Playing the poker machine requires select the use action for the coin 1792. Selecting the use item from the list of actions retrieves a list of items from the player's inventory 1794. Selecting an item, for example, the coin, displays a list of items upon which the coin can be used 1796. If the poker machine is selected, a description of the resulting action is displayed 1798. The description can read, for example, "You insert the coin in the slot and pull the handle. Against all odds, '777' appears an ear-piercing horn announces you as the winner of the jackpot. The barman lumbers over, hands you 5 big ones and . . . " The game can be saved in its current state at anytime 1799.

FIG. 11 depicts network-related mobile station usage information associated with the player 100 which is used to enhance the realism and enjoyment of the game of the presently preferred embodiment. In FIG. 11, "mobile usage profiling" information, namely information regarding the patterns of use of mobile communications by the player 100, is communicated from the network 306 to the server 310. Such profile information includes, for example, the fact that player 100 is currently actually located in the city of Los Angeles. This information can be used in the multi-player interactive fiction game of the presently preferred embodiment by creating a virtual space 312 made up of locations in the city of Los Angeles, thus lending additional realism and interest to the game. The game itself can be designed with profiling information in mind. For example, within the definition of a virtual world, e.g., lightweight interactive fiction engine language (LIFE), profile tags can be specified. The profile tags are used to indicate that the virtual world should be customized at the tag point. Customizing can include extracting relevant information from the mobile station or from a profiling database on a server. For example, if the game space dictates that a player is moving (or walking) towards, e.g., a train station, a profile tag can be used to indicate that a relevant station name be inserted into the virtual world. For example, Waterloo Station in London can be inserted into a virtual space built around a London theme.

FIG. 12 depicts how information regarding the manner in which player 100 plays the multi-player interactive fiction game of the presently preferred embodiment is incorporated into the game. This information is called "game play profiling" information. Thus, if the player 100 shows, during the course of a game, a preference for a particular type of action, say one associated with travel, this preference can be conveyed between the lightweight language application 406 and the server 310. The game can then be adapted to include more options of this type for the player 100 on a real time basis. Thus adding additional credibility and interest to the game.

FIG. 13 depicts a lightweight interactive fiction engine language (LIFE) used to create the virtual space in a cost effective and well documented manner. Thus, allowing the virtual space to be evolved over time. LIFE is a generic description language which utilizes the Java™ environment.

A LIFE world 1312 which forms the basis for the game of the presently preferred embodiment, is one of the set of worlds 1300 which can be supported in the system. The world 1312 is made up of a set of "levels" 1302, one of which can, for example, be defined as "Los Angeles" 1316.

Each level, e.g., 1316 is made up of a number of connected "locations", e.g., The Grand Hotel in Los Angeles 1320. The Grand Hotel is one of the set of locations 1304 in Los Angeles 1316. Within each location is a set of objects 1306 e.g., a door 1326 in the hotel on the second floor, which is a subset of the set of objects 1306. Each such object 1306 is "interactable" and the user may interact with the object through associated actions. An action, in a set of actions 1308, can be, for example, "to open" 1330. Finally, associated with each action is a set of object attributes 1310, for example, "opened" 1334. Thus the specific world being considered 1312 is divided into a set of levels, for example, Los Angeles 1316. Each level has a set of locations, for example, The Grand Hotel 1320. The Grand Hotel 1320 has a set of objects, for example, a door 1326 on the second floor with which a player may interact. Interaction rules are defined by a set of actions, for example, to open 1330, that may be associated with either objects or locations. The consequence of the action is an attribute, for example, door opened 1334. A player can either be a human player 100 or a software agent 614. The "view" of the virtual space which is presented to the player 100 or 614 will vary according to the current actual location of the player 100 or 614. The available interaction options and objects will vary correspondingly.

Locations, for example, The Grand Hotel 1320, define the fabric of the LIFE world. Locations describe all rooms, places, etc. which are accessible to players 100, 104, or 604. Each location has a description which allows a player to determine his position. Each location has a set of connections to other locations, for example, an airport 1322. Connections define the topology of the LIFE world and are used by the LIFE engine to define the navigational options available to a player. Location specific interaction is defined via a set of specific actions.

Object definitions, for example, the door 1326, are used to describe items with which a player can interact. Like locations, objects have a description allowing players 100, 104, or 604 to know what the object is. The players are made aware of a set of actions defining permitted, object specific, interaction rules, for example, to open 1330. A set of object attributes 1310 representing the state of the object, for example, door is open 1334, is also provided.

In the presently preferred embodiment, actions, for example, to open 1330, may require more advanced interaction than merely applying them to an object. As an example, a key may be required to open a locked door. LIFE handles these situations by allowing actions to have arguments of a specific type. For example, the "unlock" action on the "door" would require a "key" as an argument.

Figure 14:
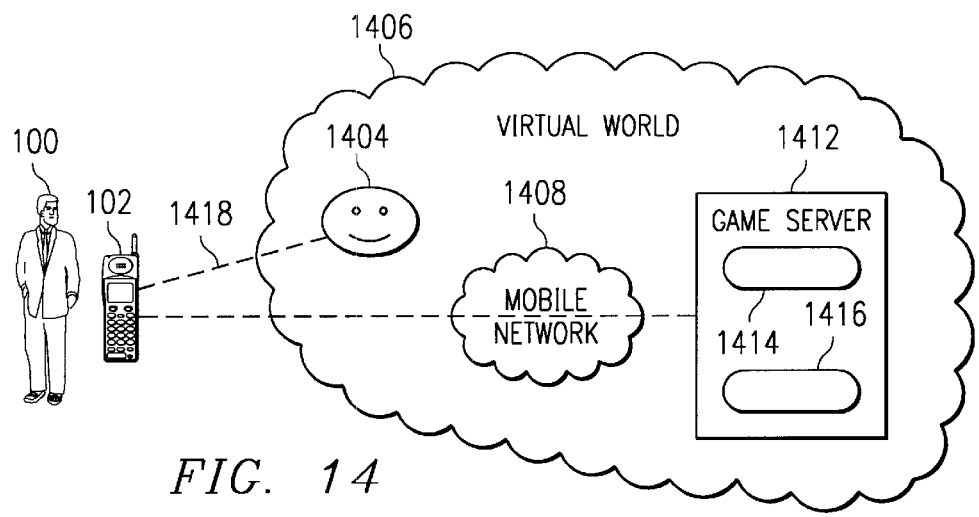
FIG. 14 depicts a game player 1100 using a mobile station 1102 to play an interactive fiction game on a mobile network.

FIG. 14 depicts a game player 100 using a mobile station 102 to play an interactive fiction game on a mobile network. In the presently preferred embodiment, the mobile station 102 establishes a connection through a mobile network 1408 to a game server 1412. A user agent 1404 is a simulacrum of the user 100. The user agent 1404 is a software entity acting for the game player 100 (or for the mobile station 102). It should be appreciated that reference is made to the user 100 and/or the user terminal 102 in an interchangeable manner, the intended meaning being clear from the particular context. The user agent 1404 is thus responsible for presenting a current state of the interaction fiction game to the user 100, and equivalently, acts as a communication intermediary between the user 100 and the game server 1412. The mobile network 1408 supports a connection between the mobile station 102 and the game server 1412. An interactive fiction engine (wireless game center) 1414 runs on the game server 1412. The engine 1414 supports the execution of a virtual world 1406 on the game server 1412. From an implementation perspective, in the presently preferred embodiment, the virtual world 1406 is an executable software component running on the interactive fiction engine 1414. The virtual world 1406 updates states which define it based on action requests received from the user 100 by means of the user agent 1404. Actions which can be taken in the game by the user 100 are determined by the state of the virtual world 1406. In the presently preferred embodiment, the virtual world is based upon a structured definition of content as described in FIG. 13. The game server 1412 also contains a presentation engine 1416 which processes data relating to the game and the virtual world 1406 into a format that can be presented by the user agent 1404 on the mobile station 102. The presentation engine 1416 output can be tailored according to the limited man/machine interface available on the user terminal 102.

The virtual world 1406 can be defined using an XML schema, which is run through a world compiler, generating a computer language specific version of the particular virtual world 1406 definition being used. The language specific world is thus compiled into an executable form. Support for both the language and the virtual world concepts embodied in the definition of the virtual world, exist on the game server 1412.

It should be appreciated that the utilization of menu text presentations and icon display elements combined with hypertext user selectable menu items significantly ameliorates or substantially overcomes the complexities and difficulties of typing in free text commands on a mobile station keyboard. The particular issues encountered in a wireless communication environment, for example, low data rates, significant error rates, and wireless communication protocols, require particular technical solutions to present the aforementioned menu/icon/hypertext base system.

Predefined game options both within the story segment 704 and the interactive segment 708 result in a "tree" type of structure. The structure reprsents possible "routes" which a game player can travel depending on his or her choices as they move through the game. This type of game structure supports a "predictive command style implementation" thus, providing a streamlined form of interaction. In particular, by optimizing the options presented during game play, the amount of data transmitted to the mobile station is decreased. Thus, a more effective response time results. This result is particularly useful when utilizing low bandwidth, high latency networks.

Figure 15:
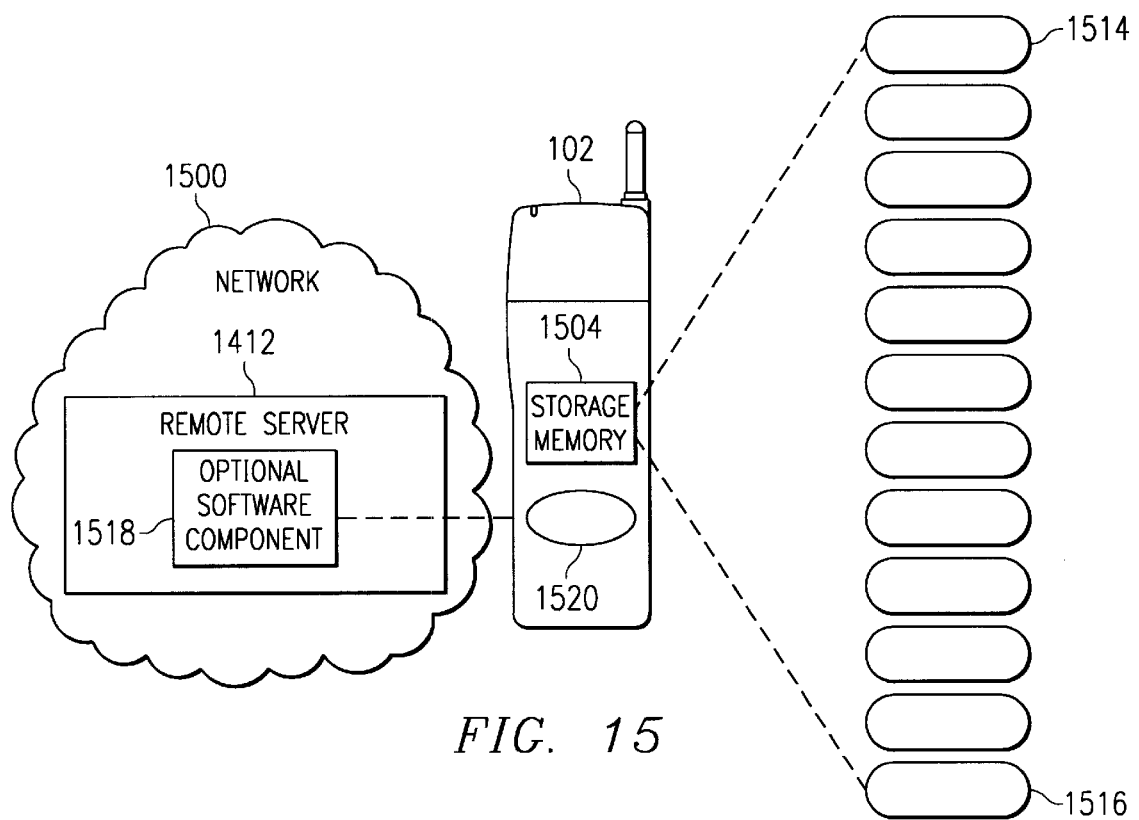
FIG. 15 depicts the profiling of mobile station activity in order to customize the service context.

FIG. 15 depicts the profiling of mobile station activity in order to customize the service context. In the presently preferred embodiment, customization relates to the playing of an interactive fiction game. As a player 100 makes use of a mobile station 102, we note that there is a distinction between the virtual world within which the player plays the game, and the real world within which the player actually functions. Having made that distinction, it is noted that while fantasy is typically a desired characteristic of games, a degree of reality or mapping between the "real world" and the "virtual world" can, in fact, add a drama and a realism to the fantasy which enhances the entertainment impact. In one embodiment, the mobile station 102 maintains key environment information 1514–1516 in a storage memory 1504. This environment information 1514–1516 relates to the real world in which the player actually is situated. For example, the mobile station 102 can store in the onboard memory 1504 statistics such as call frequency, average call duration, top five local locations visited (that is, locations in the player's home country), top five global locations visited, top five wireless services accessed (for example, "follow me" enables calls directed to a particular mobile station to be forwarded to another mobile station), top five local numbers called, top five countries called, etc. These statistics can be constantly maintained, updated and stored in the memory 1504 of the mobile station 102. Thus they are available to be used in customizing a service which is required by the user from the user terminal 102.

Placing this information 1514–1516 into the game context, the various story segments can take place in particular, and familiar cities. The particular city provided as a virtual world when the user chooses to play a game can be made to correspond with the particular city in which the user is actually residing at the time. For example, if the user is presently in Sydney, Australia, the game context can be placed in Sydney and the virtual world, its various connected locations, and even the particular objects within the virtual world can all be tailored to provide a feeling of pleasing familiarity with the actual city in which the user is currently located. A native of Sydney will be able to actually recognize aspects of the virtual world if this is desired. In the presently preferred embodiment, when a game is started, a set of locations, that is, cities, can be automatically selected based upon the information in a user profile stored in the memory 1504. If a player calls London and Helsinki frequently, instead of selecting the city where the player currently resides, these cities could be selected instead. This feature is particularly pertinent if the user uses his mobile station when he is in those cities, as it provides an insight that the player has actually visited those cities, and would thus be expected to have some familiarity with their physical surroundings.

It is possible to use this profiling of mobile station activity both at the level of city selection, and/or at the level of particular location profiling within a given city. Thus, the virtual world 312 can be customized to include those locations that the game player frequents, such as suburbs, streets, cafes etc. This level of customization depends upon the level of accuracy associated with the location statistics which are gathered. The usage profile of a mobile station can include many attributes aside from telephone calls. For example, usage profiling can include information from the calendar, address book, contacts list, messages, and other non-phone applications that reside on the mobile station 102. This type of profiling can be seen in the following example: when a player receives notification that "They need to meet the fat man on the corner of 5th and Park Avenue at 5 pm", a booking for that time is placed into the mobile station calendar. Another example from an interactive fiction game: when two people sit down at a table in a cafe and exchange business cards. In such a scenario, each player's contacts list would be updated by the server with the business card of the other player. Thus, the usage profile can affect the game state and the game state can be made to affect the usage profile.

In addition to usage profiling, the mobile station itself can be used to introduce real world data to affect the game state. For example, the clock in the mobile station could be used to set the time in the virtual game space. In another instance, a mobile station equipped with a sound recorder and voice detection facilities can be used to modify the state of a game. For example, the game may require the player to proceed to a particular location and obtain a clue. The clue could be a sound segment that when "found" (that is, recorded and transmitted), changes the state of the game. Thus, the mobile station can affect the game state and the game state, in turn, can affect the mobile station.

Mobile station activity profiling is a software component 1520 which resides in the mobile station 102, and can include an optional software component 1518 residing on a remote server 1412. The flexibility to distribute this information between information gathered by the mobile station 102 itself and information gathered within a network 1500 is extremely useful. While information gathered by the mobile station 102 will have a first level of accuracy and detail, being gathered by the mobile station 102 itself, there is no issue in gaining privileged access to information which a network operation may be unwilling to provide. This latter type of information would reside on the remote server 1412. On the other hand, the richness of information available to the operator of a network 1500 is undoubtedly greater than that afforded by information gathering capabilities within a mobile station 102. The present embodiment thus enables these two types of information to be mixed and matched as desired.

It is appreciated that while mobile station activity profiling has been described above in the context of a network based electronic game, this type of profiling can equally be applied to other types of services which are accessed by means of the mobile station 102. Other services can include, for example: a restaurant guide in which is restaurants are listed according to mobile station location; an entertainment guide in which options are listed according to time and mobile station location; a virtual city tour can be presented based on location of the mobile station or destinations called; or a travel service which notifies a user of travel deals based on call history, contact list information, calendar entries, roaming locations, etc.

Clearly, the user can be given the ability to turn automatic profile data acquisition and processing on and off within the mobile station, and within the broader network context, as he desires. This feature enables users to have control over their own personal information and, more to the point in the present context, information which is secondary but nonetheless derived from their own behavior patterns.

In order to incorporate user profile information in a game, user profile information retrieved from the memory 1504 in the mobile station 102 is sent to the server 1412. The server 1412 incorporates this profile information into the game service 1414. The virtual world 1406 is then constructed while taking account of the user profile information. It is appreciated that maximum user control over confidential information is provided by maintaining the above described capability primarily within the mobile station 102 itself.

Figure 16:
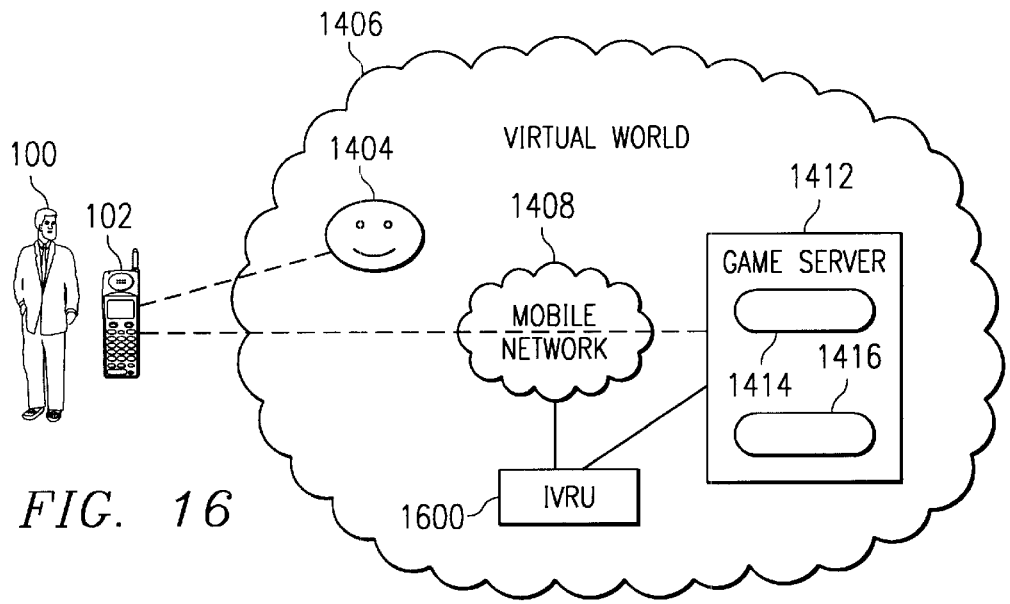
FIG. 16 depicts deployment of virtual voice-based characters in a game setting within a wireless game environment.
Figure 17A:
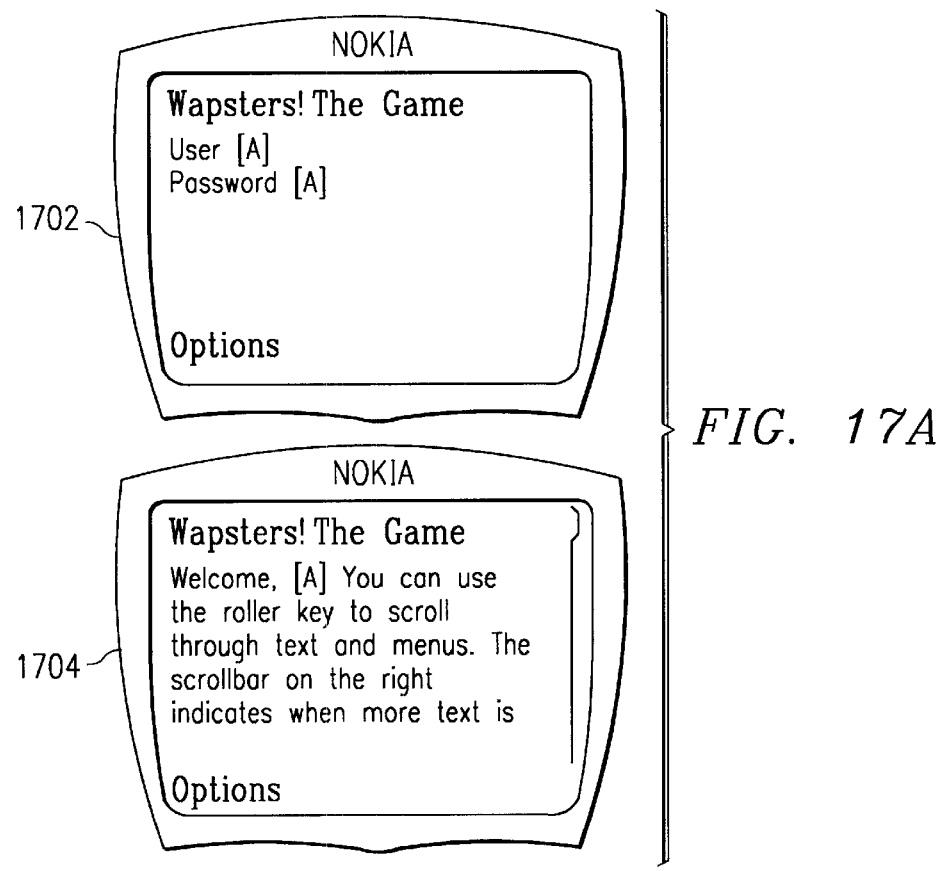
FIGS. 17A–N depict a working example of the presently preferred embodiment showing user information displayed on the display of a mobile station.
Figure 17B:
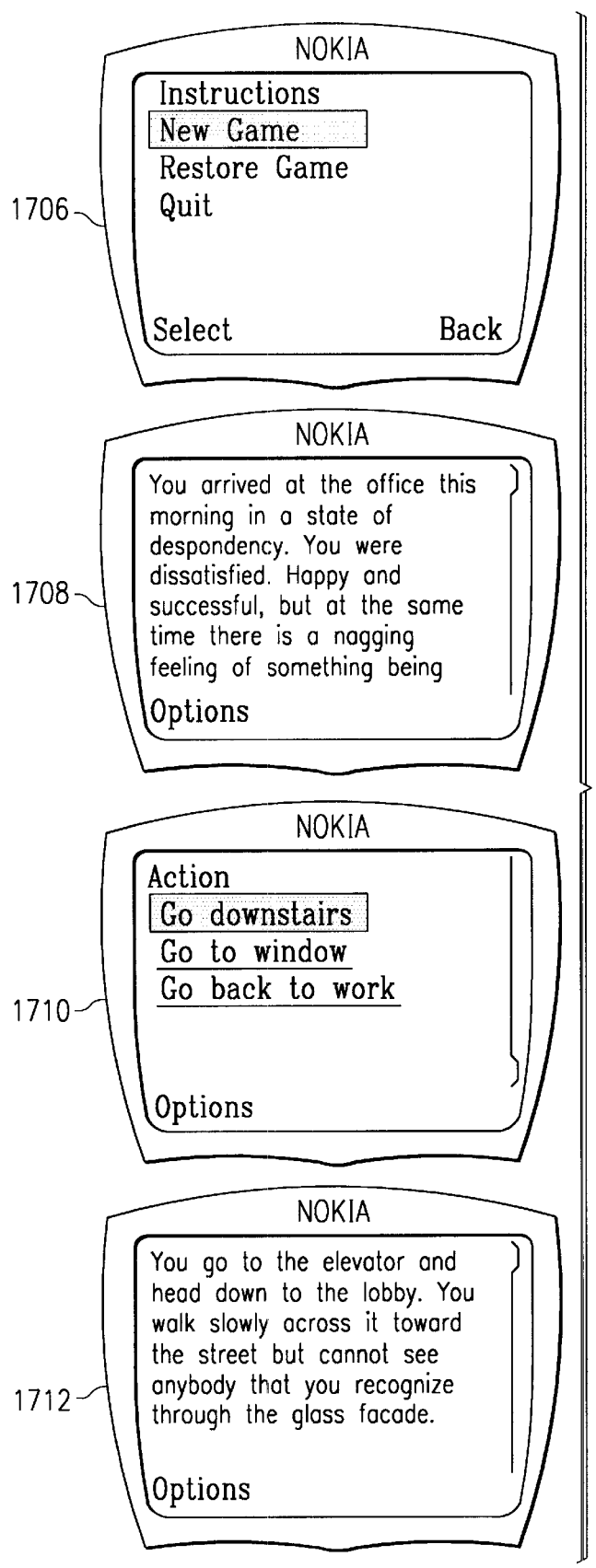
Figure 17C:
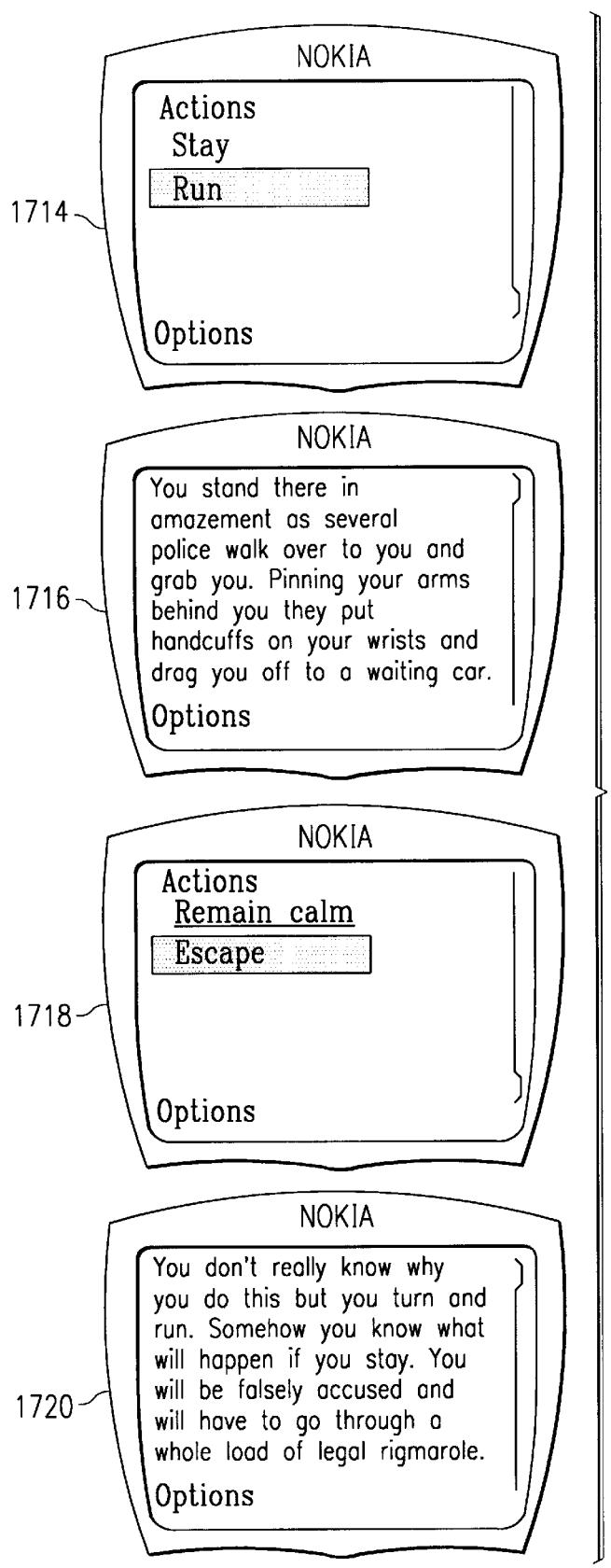
Figure 17D:
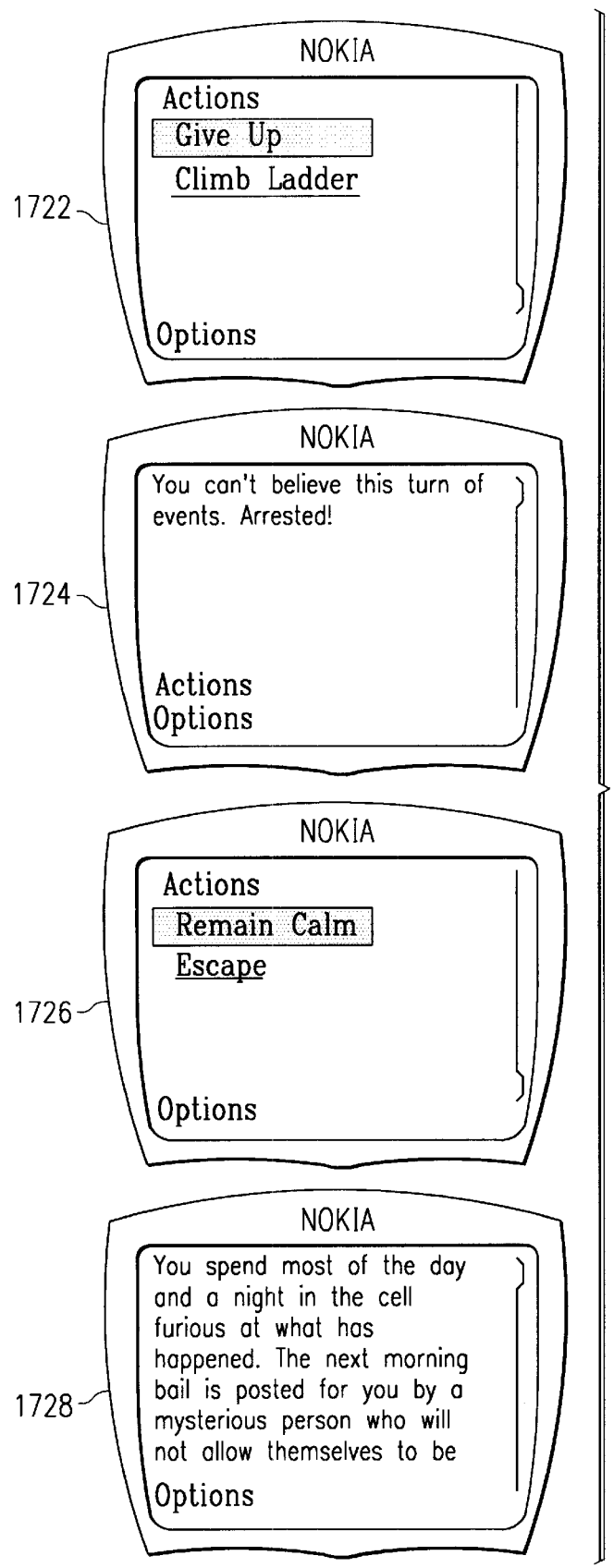
Figure 17E:
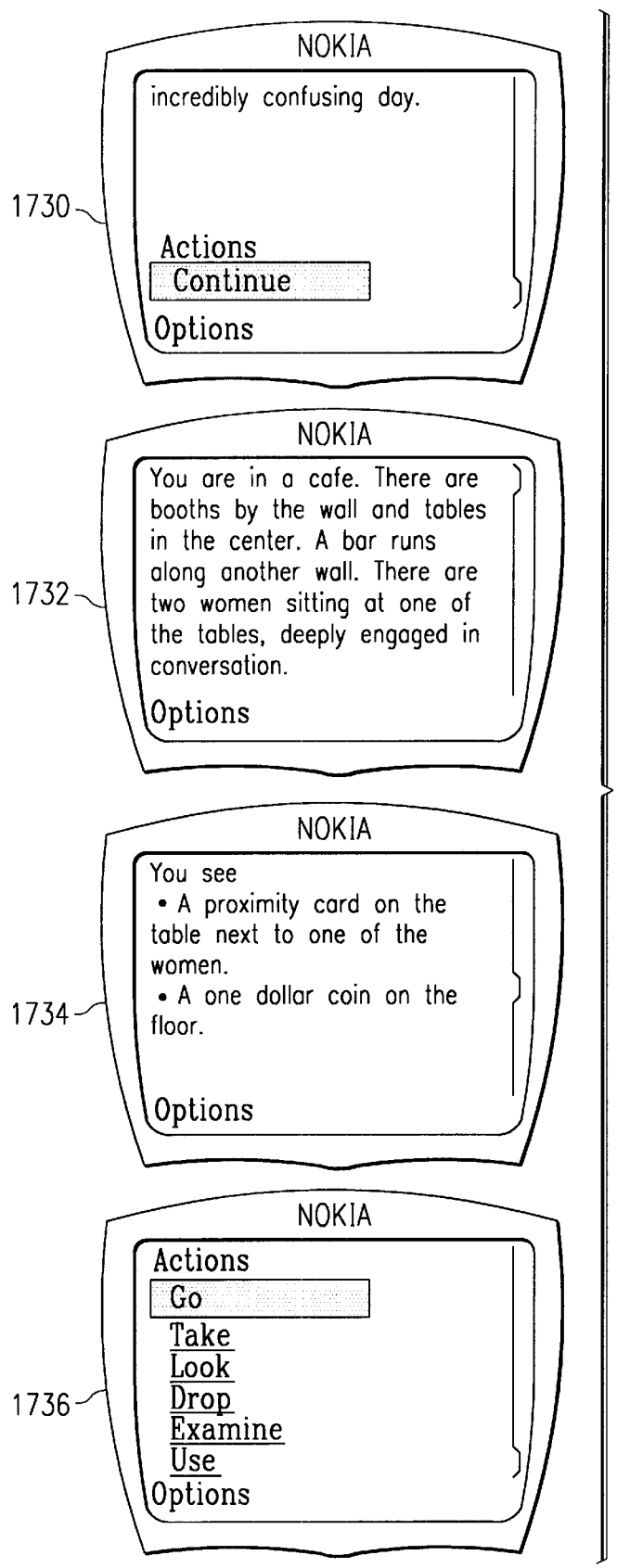
Figure 17F:
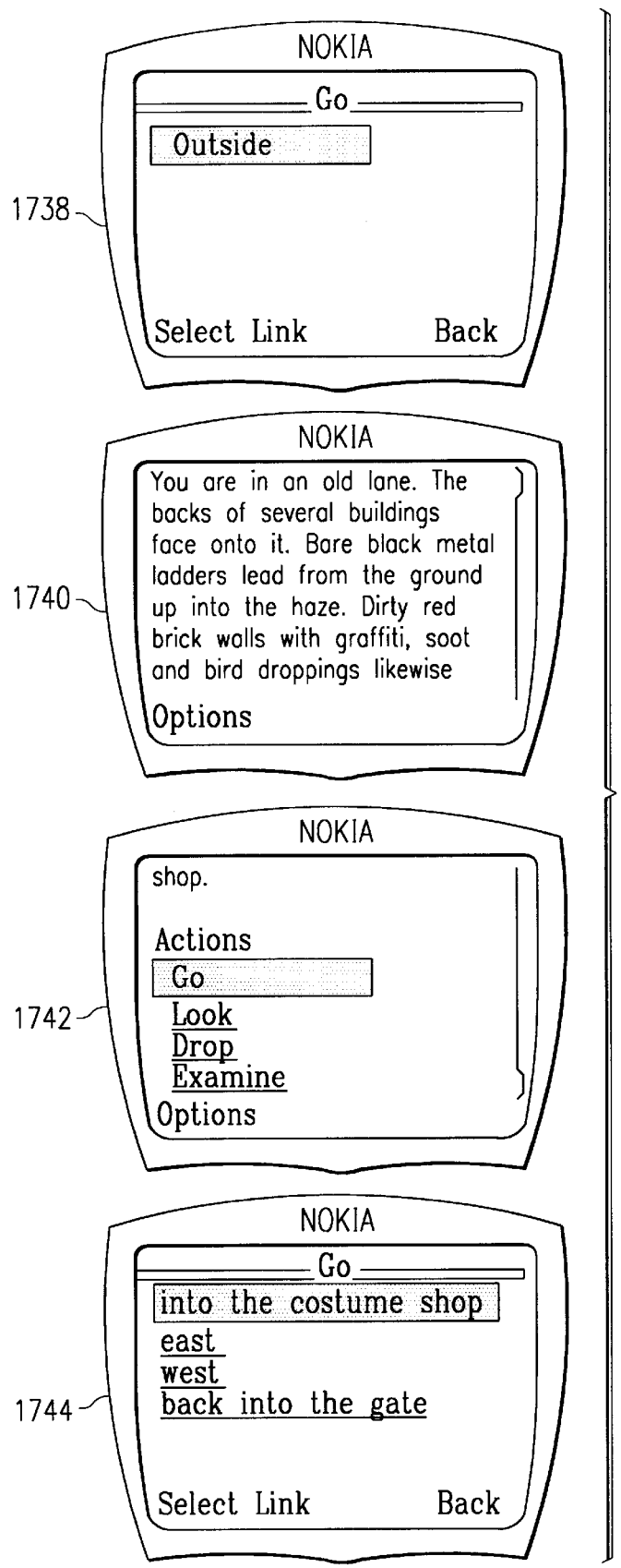
Figure 17G:
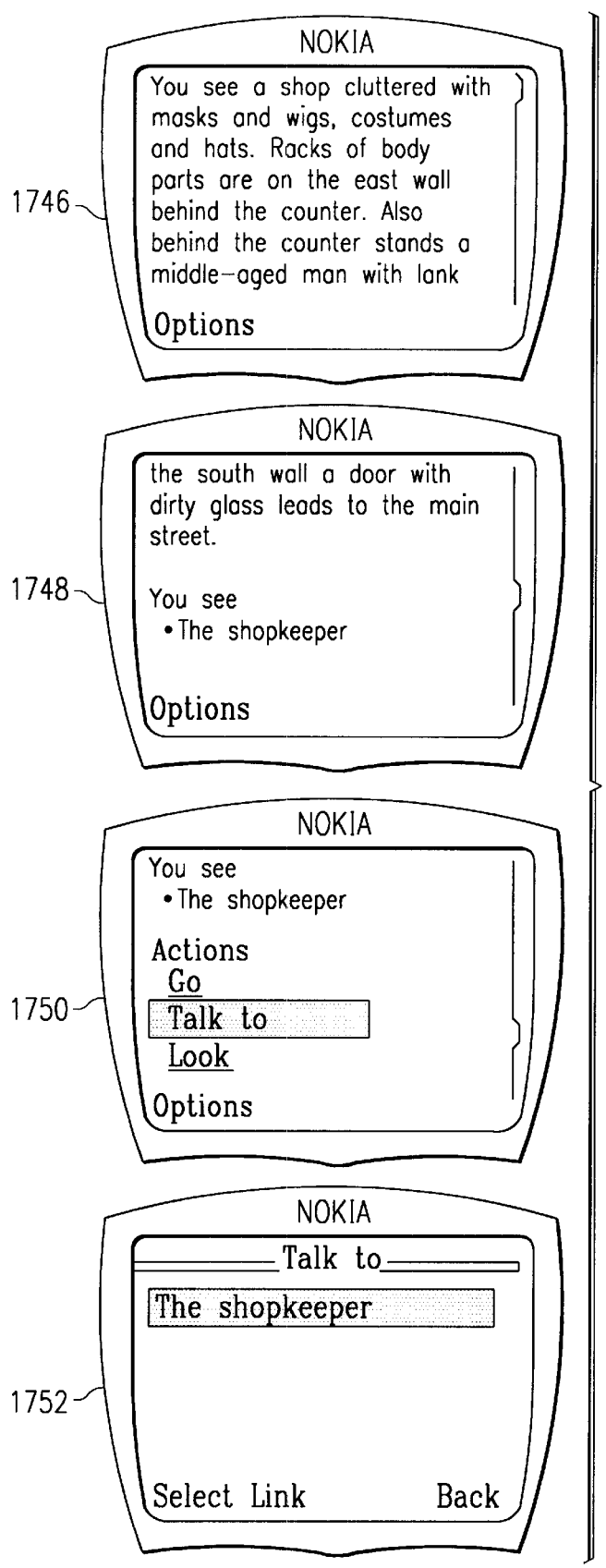
Figure 17H:
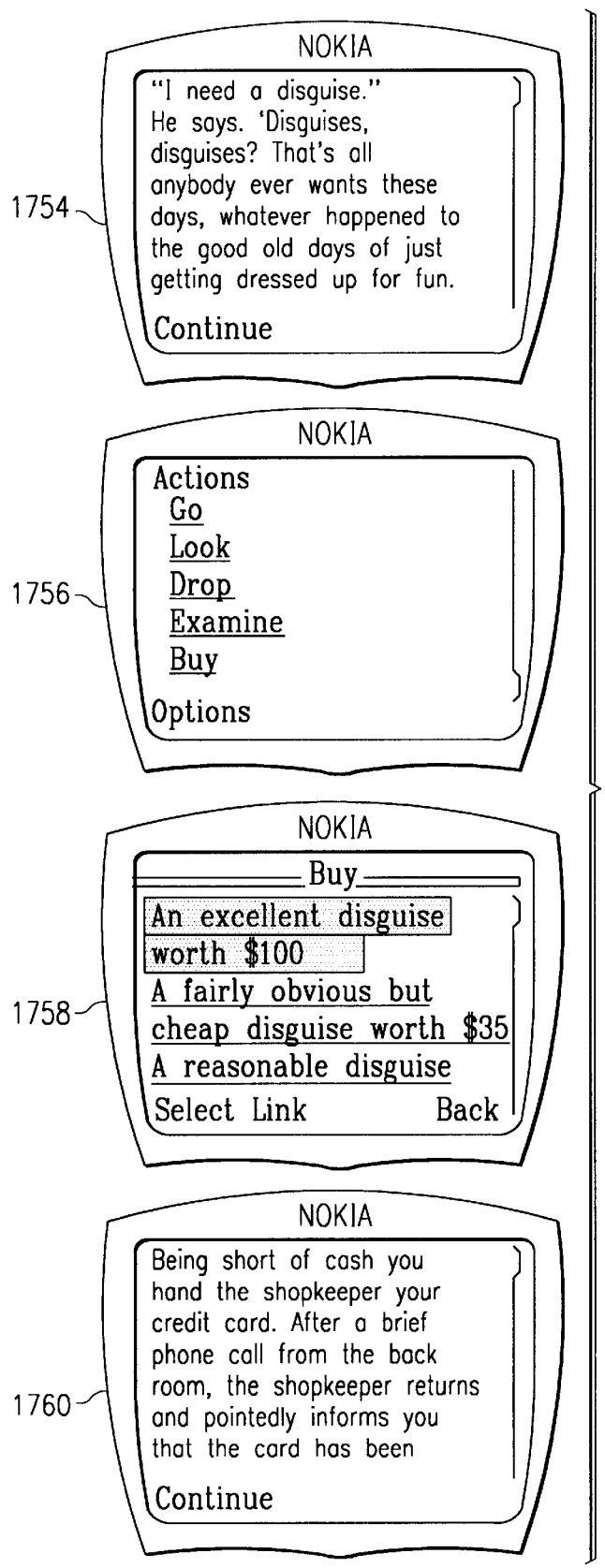
Figure 17I:
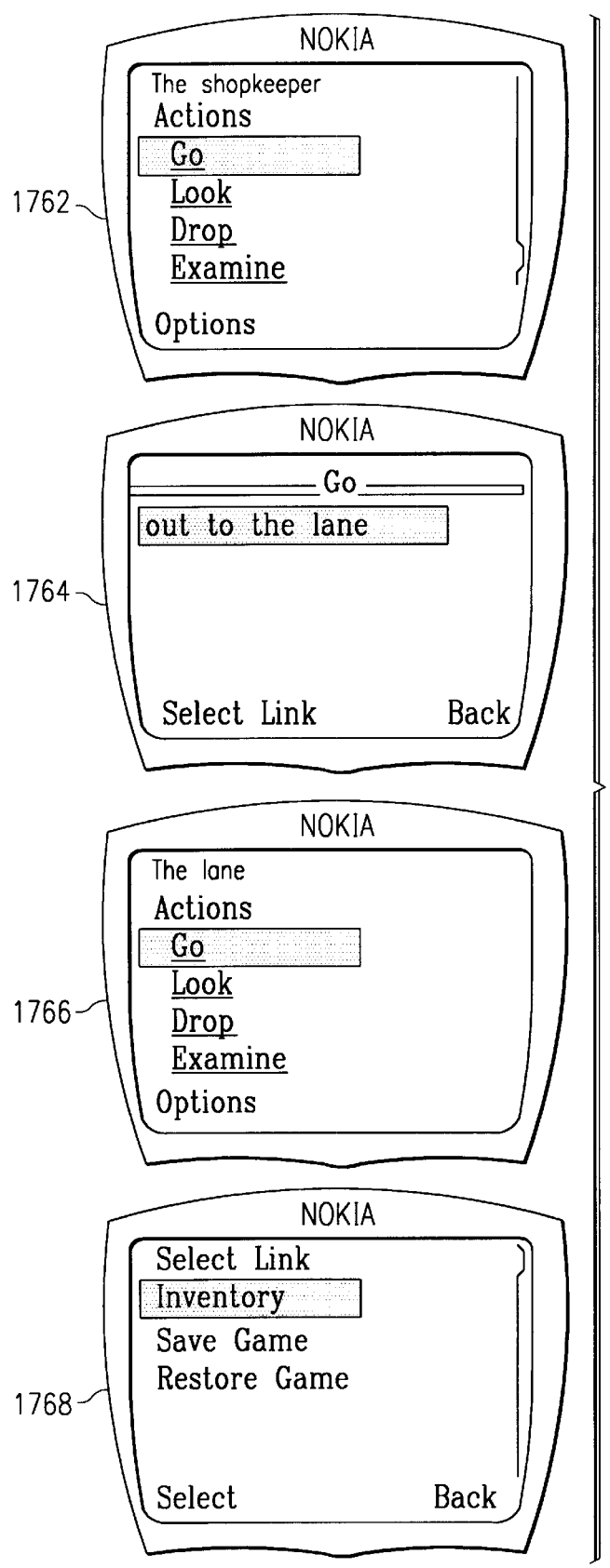
Figure 17J:
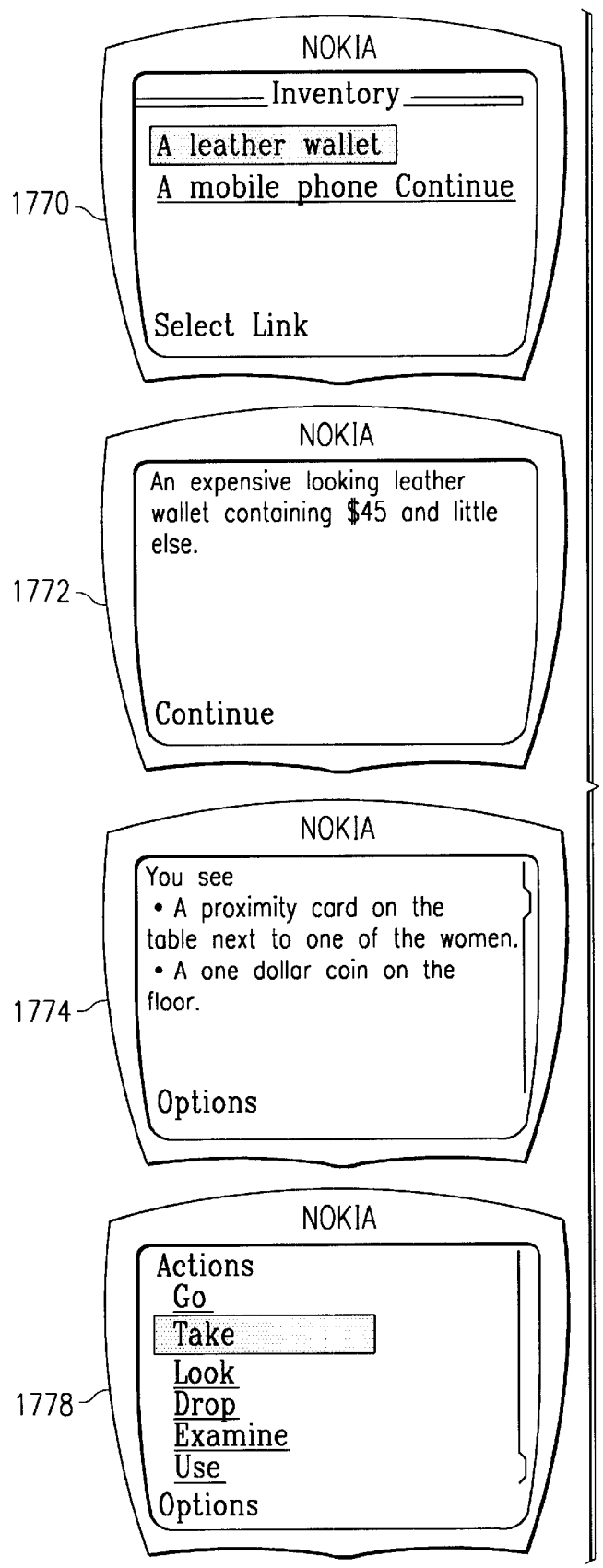
Figure 17L:
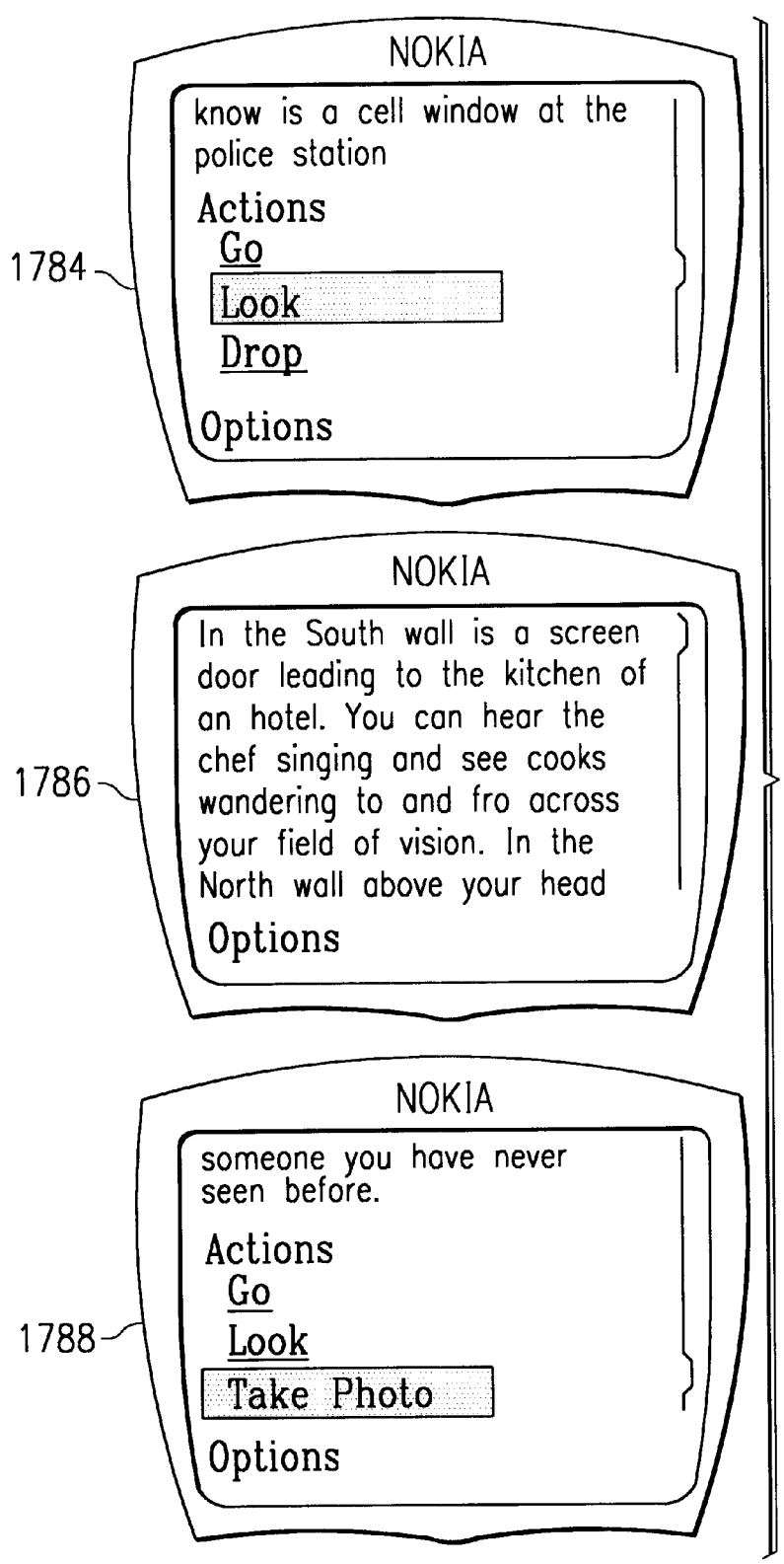
Figure 17M:
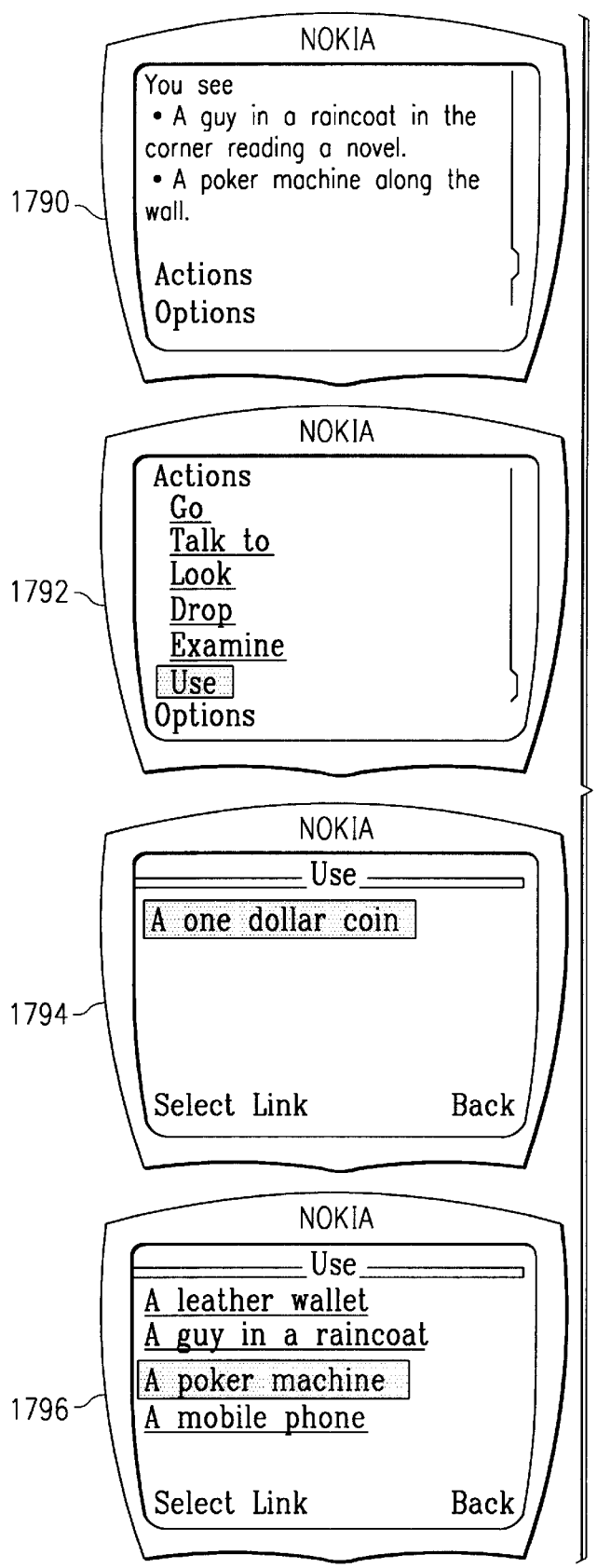

FIG. 16 depicts deployment of virtual voice-based characters in a game setting within a wireless game environment. A voice character, which can for example, be entity 612 makes use of an interactive voice response unit (IVRU) 1600 in order to incorporate voice content into the game. The game runs on the game server 1412 to which a connection has been established by the mobile station 102 being used by the user 100. The IVRU 1600 interacts with the server 1412, enabling the server 1412 to incorporate voice response elements at the correct "time and place" within a game taking place within the virtual world 1406. As will be explained in more detail below, the IVRU 1600 interacts also with the mobile network 1408. This interaction is required to provide the actual voice input to the game and also to provide call connection and establishment facility.

The game player 100 playing a game encompassing a virtual world 1406 using a mobile station 102 can arrive at a point in the game where interaction with a voice based virtual character is possible. At this point, the game player 100 interacts with the character by vocalizing a game action, i.e., speaking into the mobile station. The IVRU 1600 acts as a voice recognition unit to convert the vocalized command to a text response that can be sent to the game server 1412 across the connection. The game server 1412 receives the command and updates the game state (virtual world) 1406 accordingly. The game server 1412 then issues a command to the mobile station 102 to update the game context being presented on the mobile station 102. Should the game now require that the virtual voice based character vocally respond to the game players command, the game server 1412 issues a command to the IVRU 1600, directing the IVRU 1600 to generate a vocal response. An IVRU 1600 residing on the game server 1412 can send that vocal response to the mobile station 102 by means of a voice channel on the wireless. If an IVRU 1600 resides on the on the mobile station, a command can be sent to the mobile station 102 by the game server 1412 and then converted to a voice response.

In reference to the game described in FIG. 17, at some point in the story segment, the player 100 may be presented with a prompt such as "your mobile phone is ringing". The game server 1412 could then place a call to the player's mobile terminal. Upon answering the call, the player will be greeted by a virtual voice character. The IVRU 1600 is used to realize the virtual voice character. The virtual voice character represents a virtual character in the game rendered in voice form. The character can be rendered in a textual format as well. An example realization of a virtual voice character can be, for instance, "Hi <player name>, it's the Commissioner here. Seems like we have a little problem and need your help. Someone is trying to frame you." The player 100 may then be prompted on the text display with a series of options. The series of options can be, for example, "What do you mean, someone is trying to frame me? The player 100 may either select the option via the input keys 400 or may speak the phrase. The IVRU 1600 is used as a voice recognition unit to determine the selected option, in the event the player 100 chooses to speak the phrase, to be sent to the game server 1412.

In response, the game server 1412 chooses the appropriate story segment to deliver to the player 100. The story can be, for example, that the commissioner continues to warn the player. The commissioner's words are synthesized by an IVRU 1600 and can be, for example, "Look <player name>! We think it's Joe Diamond, but we can't be sure. If I was you, I'd watch my back and try to find out what he's up to." The player 100 can then be presented with a series of options on a textual display. The options can be, for example:

"1. Thanks for the pointer Commish. I will watch my back. Let me know if you hear anything more."
2. Give me a break! Joe's in the slammer. Anyway, why would he want to set me up?"
3. Don't be stupid Commissioner. Joe would never do that to me. Goodbye, and bye the way, don't call me again!"

The player 100 can speak the options into the mobile station 102 or use the text input keys 400 to make a selection. Speaking the options invokes the voice recognition of the IVRU 1600.

As another example, the game player 100 can get to a point in the game where some type of advice is required. The game player can ask "what can I do here?" by directing this question to the mobile station microphone. This question is translated to text by the IVRU 1600 and sent to the game server 1412 over the connection. A software entity resident in the game examines the various options available to the player at this point, and replies "you can either take the left stairs down to the ground floor to escape the police or you can go up to the roof and catch the helicopter", via a voice call to the station.

In another example, a player can be initially drawn into a game via a series of phone calls placed to the player 100. Phone calls initiated by software entities to a player 100 inviting him to initiate a game would, typically, be based upon a user profile indicating that such calls would be welcome.

To facilitate use of the IVRU 1600, an interactive application, for example, the game described in FIG. 13 can be configured with tags (or flags) which indicate that the IVRU 1600 can be used. For example, in the game described in FIG. 13, either the game universe or a particular segment (or segments) of the game can be flagged as voice interactive. In this example, when the game server 1412 process a game or story segment that can utilize the IVRU 1600, the IVRU 1600 is activated for the particular game or story segment.

The IVRU 1600 can be resident on the mobile station 102 in order to implement the translation between voice commands from the game player 100 and the character strings which are sent over the connection to the game server 1412.

In an alternative embodiment, the IVRU 1600 can be resident in the game server 1412.

It should be appreciated that voice and cellular (GSM, CDMA, or TDMA) short message service can coexist, supporting the voice/data mix which is required in the aforementioned description. This is only one embodiment using a particular set of technologies to implement this type of functionality. It should further be appreciated that conversion from speech to text, or rather to character, can be implemented at the mobile station 102, thus enabling data only to be carried on the connection to the game server 1412. Alternatively, voice can be carried directly between the mobile station 102 and the game server 1412 over the connection and converted at the server. Various tradeoffs between processing power and network bandwidth enable different solutions to be found.

Figure 18:
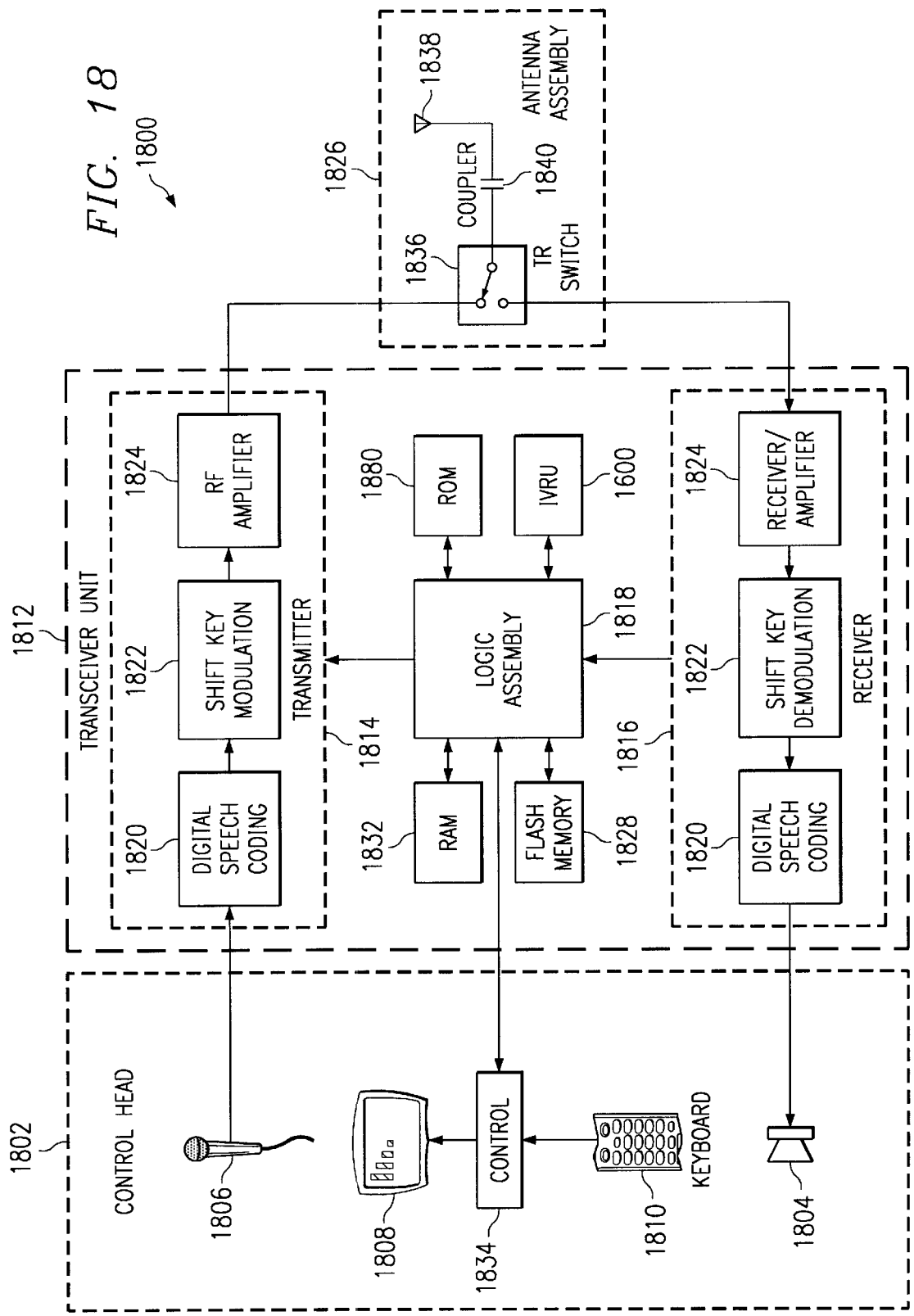
FIG. 18 depicts a block diagram of a mobile station 1800 that can be used in the disclosed embodiments.

FIG. 18 depicts a block diagram of a mobile station 1800 (and 102) that can be used in the disclosed embodiments. The mobile station 1800 includes, in this example:

A control head 1802 containing an audio interface, i.e. a speaker 1804 and microphone 1806. The control head 1802 generally includes a display assembly 1808 allowing a user to see dialed digits, stored information, messages, calling status information, including signal strength, etc. The control head generally includes a keypad 1810, or other user control device, allowing a user to dial numbers, answer incoming calls, enter stored information, and oz perform other mobile station functions. The keypad 1810 functions as the reduced keypad of the presently preferred embodiment. The control head also has a controller unit 1834 that interfaces with a logic control assembly 1818 responsible, from the controller unit 1834 perspective, for receiving commands from the keypad 1810 or other control devices, and providing status information, alerts, and other information to the display assembly 1808;

A transceiver unit 1812 containing a transmitter unit 1814, a receiver unit 1816, and the logic control assembly 1818. The transmitter unit 1814 converts low-level audio signals from the microphone 1806 to digital coding using a codec (a data coder/decoder) 1820. The digitally encoded audio is represented by modulated shifts, for example, in the frequency domain, using a shift key modulator/demodulator 1822. Other codes transmission utilized by the logic control assembly 1818, such as station parameters and control information, may also be encoded for transmission. The modulated signal is then amplified by RF amplifier 1824 and transmitted via an antenna assembly 1826;

The antenna assembly 1826 contains a TR (transmitter/receiver) switch 1836 to prevent simultaneous reception and transmission of a signal by the mobile station 1800. The transceiver unit 1812 is connected to the antenna assembly 1826 through the TR switch 1836. The antenna assembly contains at least one antenna 1838;

The receiver unit 1816 receives a transmitted signal via the antenna assembly 1826. The signal is amplified by receiver amplifier 1824 and demodulated by shift key demodulator 1822. If the signal is an audio signal, it is decoded using the codec 1820. The audio signal is then reproduced by the speaker 1804. Other signals are handled by the logic control assembly 1818 after demodulation by demodulator 1822; and A logic control assembly 1818 usually containing an application specific integrated circuit (or ASIC) combining many functions, such as a general purpose microprocessor, digital signal processor, and other functions, into one integrated circuit. The logic control assembly 1818 coordinates the overall operation of the transmitter and receiver using control messages. Generally, the logic control assembly operates from a program that is stored in flash memory 1828 of the mobile station. Flash memory 1828 allows upgrading of operating software, software correction or addition of new features. Flash memory 1828 is also used to hold user information such as speed dialing names and stored numbers. The mobile station 102 aspects of the gaming environment can be stored in this memory.

Additionally, an IVRU 1600 can be connected to the logic control assembly or IVRU software can be executed by the logic control assembly in order to perform the voice input aspects of he presently preferred embodiment.

In addition to flash memory 1828, the mobile station will typically contain read only memory (ROM) 1830 for storing information that should not change, such as startup procedures, and random access memory (RAM) 1832 to hold temporary information such as channel number and system identifier.

Figure 19:
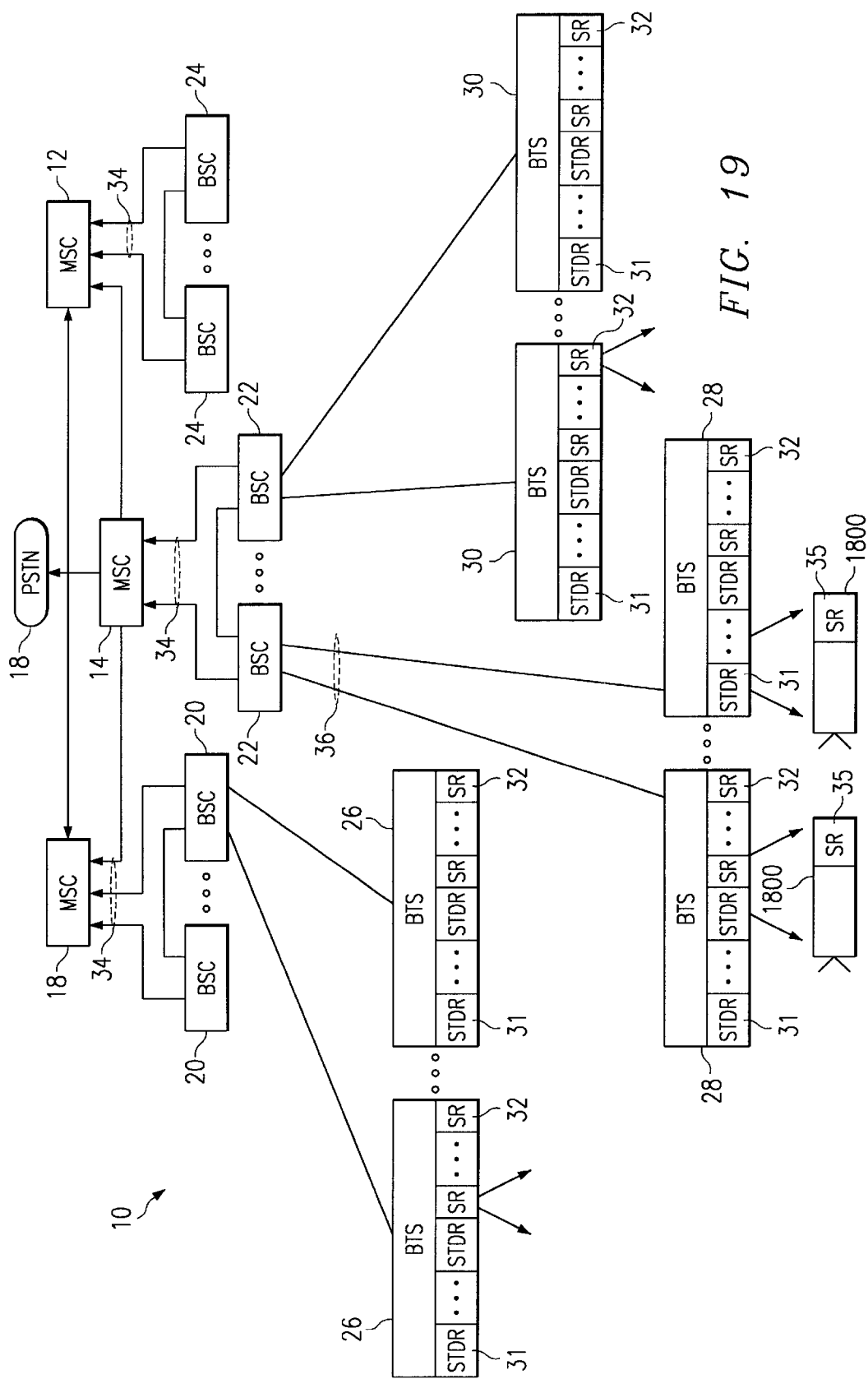
FIG. 19 depicts a block diagram of a cellular communications system suitable for implementing the disclosed embodiments.

FIG. 19 depicts a block diagram of a cellular communications system suitable for implementing the disclosed embodiments. A cellular telephone system 10 has a plurality of mobile switching centers (MSC) 12, 14, 16, or mobile telephone switching offices (MTSO), that are connected to each other and to a public switched telephone network (PSTN) 18. Each of the mobile switching centers is connected to a respective group of base station controllers (BSC) 20, 22, 24. Each base station controller is connected to a group of individual base transceiver stations (BTS) 26, 28, 30. Each base transceiver station of the groups 26, 28, 30 defines an individual cell of the cellular telephone system.

Each base transceiver station of the groups 26, 28, 30 includes hardware and software functions required to communicate over communications channels of the system 10; and includes transmitters and receivers for communication with mobile telephone units. Each base transceiver station 26, 28, 30 also includes a plurality of individual standard receivers (StdR) 31 and scanning receivers (SR) 32 for scanning selected portions of the communications channel. Each base transceiver station 26, 28, 30 further includes digital multiplex equipment for transmission of audio traffic to its associated base station controller. It is the base transceiver stations 26, 28, 30, along with their associated base station controllers 20, 22, 24 and mobile switching centers 12, 14, 16 that perform the steps described herein in order to carry out one embodiment of the invention.

A plurality of digital mobile stations 1800 (or 102) is used with the system 10 for communication over the communications channel (or radio frequency traffic channel) with a particular base transceiver station of a particular cell in which the particular base transceiver station is located. According to the various disclosed embodiments, associated with each digital mobile station 1800 is a scanning receiver for scanning selected portions of the communications channel between the mobile station 1800 and the base transceiver station of serving and neighboring cells. Each base station controller of the groups 20, 22, 24 implements audio compression/decompression, handles call establishment, disconnect, and handoff procedures, and allocates system resources between the individual base transceiver stations 26, 28, 30 associated with each of the base station controllers 20, 22, 24. More specifically, each base station controller 20, 22, 24 performs handoff execution for transferring on-going communications from one cell to another within the group of base transceiver stations 26, 28, 30 connected to the particular base station controller 20, 22, 24. Each base station controller 20, 22, 24 communicates with its associated mobile switching center 12, 14, 16 for effecting a handoff involving a cell or base transceiver station 26, 28, 30 associated with a different base station controller. Each mobile switching center 12, 14, 16 processes all requests for calls, switching functions, as well as the mobility functions of registration, authentication and handoff.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

For example, the disclosed embodiments are described as using a reduced keypad. Such keypads can be found on conventional mobile stations. However, any suitable input device may be used, such as a touchpad, for example.

For another example, the disclosed embodiments are described as providing an entertainment environment. However, the method and system described can be used for educational purposes as well. Moreover, a city selection made on the basis of a city the user would like to visit may be used to create an opportunity for travel or tourism promotion.

For another example, the disclosed embodiments are described as providing a text based game. However, the game could be played in the context of a graphical user interface and retain its customizable qualities.

What is claimed is:

1. A method of applying a user profile in a virtual space created on a mobile station in communication with a network, said method comprising:
   automatically collecting user-profile data based on user activity without the virtual space;
   storing the user-profile data;
   executing a virtual-space application;
   communicating a virtual-space application state;
   receiving a command in response to said virtual-space application state;
   adapting said virtual-space application state to reflect said user-profile data; and
   communicating said changed virtual-space application state.

2. The method of claim 1, wherein said virtual-space application state also reflects selection of one of a plurality of predetermined instructions.

3. The method of claim 1, wherein said virtual-space application state is communicated from said mobile station.

4. The method of claim 1, wherein said virtual-space application state is communicated from a base station.

5. The method of claim 1, wherein said virtual-space application is executed using a game center software application.

6. The method of claim 5, wherein said game center software application is running on a server.

7. The method of claim 1, wherein said virtual-space application is executed using a game center software application running on a server configured to communicate with a base station.

8. The method of claim 1, wherein said changed virtual-space application state is communicated to said mobile station.

9. The method of claim 1, wherein said user-profile data includes information relating to the manner in which said mobile station utilizes a network.

10. The method of claim 9, wherein said manner is represented by the call frequency of said mobile station.

11. The method of claim 9, wherein said manner is represented by the average call duration of said mobile station.

12. The method of claim 9, wherein said manner is represented by the most frequent local locations visited by said mobile station.

13. The method of claim 9, wherein said manner is represented by the most frequent global locations visited by said mobile station.

14. The method of claim 9, wherein said manner is represented by the local locations called most frequently by said mobile station.

15. The method of claim 9, wherein said manner is represented by the countries called most frequently by said mobile station.

16. The method of claim 1, wherein said user-profile data is dependent on the manner in which a mobile station utilizes a network wherein said manner is represented by the wireless services accessed by said mobile station.

17. The method of claim 1, wherein said user-profile data depends upon prior activity of the mobile station.

18. The method of claim 1, wherein said user-profile is based on information collected from at least one non-virtual space application residing on said mobile station.

19. The method of claim 18, wherein said non-virtual space application residing on said mobile station is an appointment-calendar application.

20. The method of claim 18, further comprising the step of supplementing the information stored in connection with the non-virtual space application residing on said mobile station.

21. A mobile station for communicating with a telecommunication network, said mobile station comprising a transceiver for communicating with said network;
   wherein said mobile station is configured to communicate a virtual-space application state, receive a command in response to said virtual-space application state, and convey a predetermined instruction to a server and said server is configured to change said virtual-space application state according to said instruction and said server is configured to communicate said changed virtual-space application state to said mobile station; and
   wherein said changed virtual-space application state is also dependent on a user profile containing information that is collected from without the virtual space.

22. The wireless application mobile station of claim 21, wherein said telecommunications network is configured to store use statistics of said mobile station and provide said use statistics to said server upon request.

23. The mobile station of claim 21, wherein said changed virtual-space application state is communicated by said mobile station using a menu and a menu selection on said mobile station produces said predetermined instruction.

24. The mobile station of claim 21, wherein said user profile is dependent on the manner in which said mobile station utilizes said network.

25. The mobile station of claim 24, wherein said manner is represented by the call frequency of said mobile station.

26. The mobile station of claim 24, wherein said manner is represented by the average call duration of said mobile station.

27. The mobile station of claim 24, wherein said manner is represented by the most frequent local locations visited by said mobile station.

28. The mobile station of claim 24, wherein said manner is represented by the most frequent global locations visited by said mobile station.

29. The mobile station of claim 24, wherein said manner is represented by the local locations called most frequently by said mobile station.

30. The mobile station of claim 24, wherein said manner is represented by the countries called most frequently by said mobile station.

31. The mobile station of claim 24, wherein said manner is represented by the wireless services accessed by said mobile station.

32. The mobile station of claim 21, wherein said mobile station further comprises memory for storing mobile-station usage statistics and wherein said mobile station is configured to provide said usage statistics to said server upon request by said server.

33. The wireless application mobile station of claim 21, wherein said changed virtual-space application state is communicated by said mobile station using a menu and said menu comprises one or more of a text and picture format.

34. The mobile station of claim 21, wherein a change in said virtual-space application state depends upon prior mobile station activity.

35. The mobile station of claim 34, wherein said mobile station activity includes the area in which said mobile station is most frequently used.

36. The mobile station of claim 21, wherein the user profile includes information collected from at least one non-virtual space application residing on said mobile station.

37. The method of claim 36, wherein said non-virtual space application residing on said mobile station is an address-book application.

38. A wireless application system, comprising:
  a mobile station which includes a transceiver;
  a base station which includes a transceiver wherein said base station and said mobile station communicate with each other using said transceivers;
  a server configured to run a game center software application wherein said base station is adapted to communicate with said game center software application and said game center software application is configured to execute a virtual-space application;
  wherein said mobile station is configured to communicate a virtual-space application state, receive a command in response to said application state, and convey a predetermined instruction to said server and said server is configured to change said virtual-space application state according to said instruction and said server is configured to communicate said changed virtual-space application state to said mobile station; and
  wherein said changed application state is also dependent on a user profile containing information that is collected from without the virtual space.

39. The wireless application system of claim 38, further comprising a telecommunications network configured to store use statistics of said mobile station and provide said use statistics to said server upon request.

40. The wireless application system of claim 38, further comprising a telecommunications network wherein said base station is connected to said telecommunications network and said predetermined instruction is communicated to said server across said telecommunications network.

41. The wireless application system of claim 38, wherein said user profile comprised information relating to the manner in which said mobile station utilizes said network.

42. The wireless application system of claim 38, wherein said mobile station further comprises memory for storing use statistics of said mobile station wherein said mobile station is configured to provide said use statistics to said server upon invocation of said virtual-space application and upon request by said server.

43. The wireless application system of claim 38, wherein a change in said virtual-space application state depends upon prior mobile station activity.

44. The wireless application system of claim 38, further comprising a gateway wherein said base station communicates with said game center software application using said gateway.

* * * * *